(12) United States Patent
Takayama et al.

(10) Patent No.: US 8,555,049 B2
(45) Date of Patent: Oct. 8, 2013

(54) SECURE BOOT TERMINAL, SECURE BOOT METHOD, SECURE BOOT PROGRAM, RECORDING MEDIUM, AND INTEGRATED CIRCUIT

(75) Inventors: Hisashi Takayama, Osaka (JP); Hideki Matsushima, Osaka (JP); Takayuki Ito, Osaka (JP); Tomoyuki Haga, Nara (JP); Kenneth Alexander Nicolson, Hyogo (JP)

(73) Assignee: Panasonic Corporation, Osaka (JP)

( * ) Notice: Subject to any disclaimer, the term of this patent is extended or adjusted under 35 U.S.C. 154(b) by 742 days.

(21) Appl. No.: 12/676,960

(22) PCT Filed: Sep. 30, 2008

(86) PCT No.: PCT/JP2008/002728
§ 371 (c)(1),
(2), (4) Date: Mar. 8, 2010

(87) PCT Pub. No.: WO2009/044533
PCT Pub. Date: Apr. 9, 2009

(65) Prior Publication Data
US 2010/0185845 A1    Jul. 22, 2010

(30) Foreign Application Priority Data

Oct. 5, 2007    (JP) ................................. 2007-261977

(51) Int. Cl.
*G06F 15/177*    (2006.01)

(52) U.S. Cl.
USPC ........ 713/2; 726/16; 726/17; 726/22; 726/26; 713/156; 713/157; 713/189

(58) Field of Classification Search
CPC .................................................. G06F 15/177
USPC ............ 713/2, 156, 157, 173, 175, 189–194; 726/16–17, 22–26
See application file for complete search history.

(56) References Cited

U.S. PATENT DOCUMENTS 6,263,431 B1 *   7/2001   Lovelace et al. ................... 713/2
6,978,365 B2 *  12/2005   England ........................ 713/156

(Continued)

FOREIGN PATENT DOCUMENTS

EP        1 788 506         5/2007
JP       2004-13477         1/2004

(Continued)

OTHER PUBLICATIONS

*TCG Mobile Reference Architecture*, Specification Version 1.0, Revision 1 (Jun. 12, 2007).

(Continued)

*Primary Examiner* — Ashokkumar B. Patel
*Assistant Examiner* — Linglan Edwards
(74) *Attorney, Agent, or Firm* — Wenderoth, Lind & Ponack, L.L.P.

(57) ABSTRACT

A terminal that performs secure boot processing when booting, thereby booting reliably even if, during updating of a software module, the power is cut off or the update is otherwise interrupted. The terminal comprises a CPU, a software module storage unit, a certificate storage unit, an updating unit for updating the software module and certificate, a security device provided with a configuration information storage unit for storing the configuration information of the software module, an alternate configuration information storage unit for storing the configuration information of a software module in the configuration before the update, and a boot control unit for verifying and executing the software module by using the certificate. The terminal verifies the certificate of the software module by comparing the configuration information stored by the configuration information storage unit with the configuration information stored by the alternate configuration information storage unit.

12 Claims, 17 Drawing Sheets

(56) References Cited

U.S. PATENT DOCUMENTS

| | | | |
|---|---|---|---|
| 7,512,786 B2 * | 3/2009 | England | 713/156 |
| 7,743,422 B2 * | 6/2010 | Narayanaswami et al. | 726/25 |
| 7,827,397 B2 * | 11/2010 | McCoull et al. | 713/2 |
| 7,904,707 B2 * | 3/2011 | Shear et al. | 713/2 |
| 8,117,429 B2 * | 2/2012 | Tarkkala | 713/2 |
| 8,254,568 B2 * | 8/2012 | Smith et al. | 380/28 |
| 2003/0200454 A1 | 10/2003 | Foster et al. | |
| 2004/0003288 A1 | 1/2004 | Wiseman et al. | |
| 2004/0193873 A1 * | 9/2004 | England | 713/156 |
| 2005/0021968 A1 | 1/2005 | Zimmer et al. | |
| 2005/0108564 A1 | 5/2005 | Freeman et al. | |
| 2005/0262571 A1 * | 11/2005 | Zimmer et al. | 726/27 |
| 2005/0289067 A1 * | 12/2005 | Lampson et al. | 705/51 |
| 2006/0136705 A1 * | 6/2006 | Kaimal et al. | 713/2 |
| 2007/0106890 A1 | 5/2007 | Kwon | |
| 2007/0226518 A1 | 9/2007 | Yasaki et al. | |
| 2008/0046990 A1 * | 2/2008 | Narayanaswami et al. | 726/9 |
| 2008/0104382 A1 * | 5/2008 | Tarkkala | 713/1 |
| 2008/0178257 A1 * | 7/2008 | Mishina et al. | 726/2 |
| 2009/0172376 A1 * | 7/2009 | Kiiveri | 713/2 |

FOREIGN PATENT DOCUMENTS

| | | |
|---|---|---|
| JP | 2005-523537 | 8/2005 |
| JP | 2007-72909 | 3/2007 |

OTHER PUBLICATIONS

*TCG Mobile Trusted Module Speccation*, Specification Version 1.0, Revision 1 (Jun. 12, 2007).

International Search Report issued Nov. 4, 2008 in International (PCT) Application No. PCT/JP2008/002728.

TCG Published, *TPM Main Part 1 Design Principles*, Specification Version 1.2, Level 2, Revision 103 (Jul. 9, 2007).

TCG Confidential, *TPM Main Part 2 TPM Structures*, Specification Version 1.2, Level 2, Revision 103 (Oct. 26, 2006).

TCG Confidential, *TPM Main Part 3 Commands*, Specification Version 1.2, Level 2, Revision 103 (Oct. 26, 2006).

Supplementary European Search Report issued Apr. 3, 2012 in related European Patent Application No. 08835878.3.

* cited by examiner

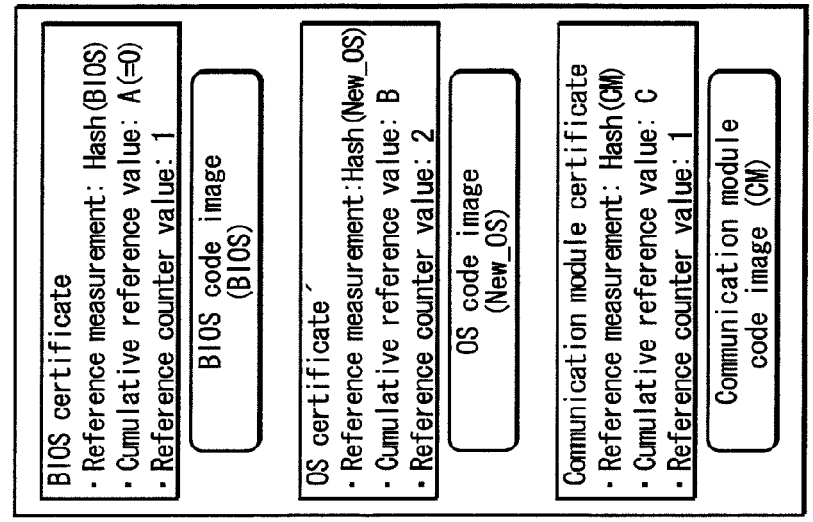
FIG. 15C Example of configuration when update is incomplete
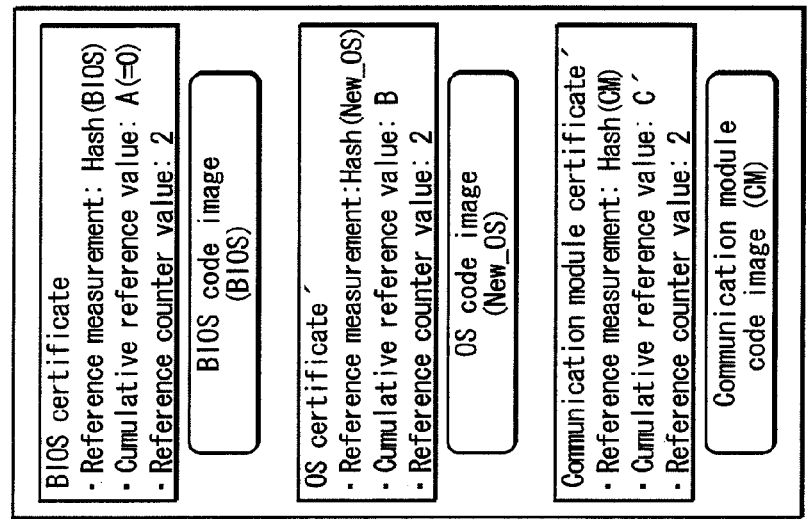
FIG. 15B Configuration when update is complete
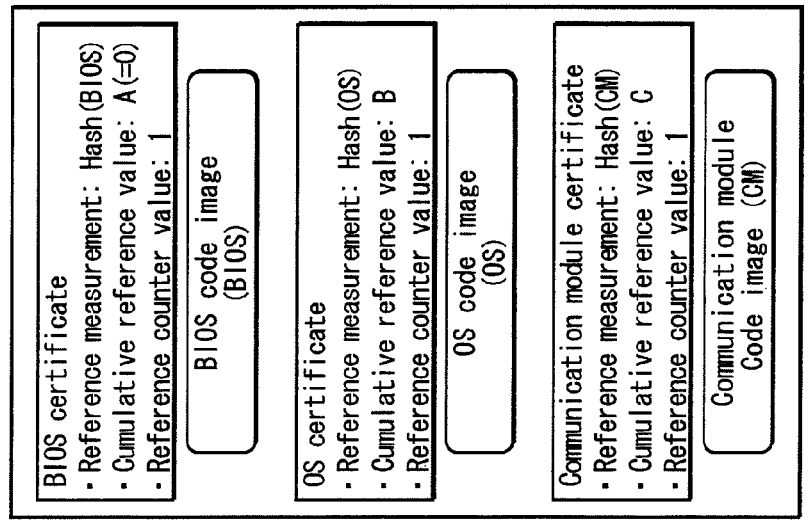
FIG. 15A Configuration before updating

SECURE BOOT TERMINAL, SECURE BOOT METHOD, SECURE BOOT PROGRAM, RECORDING MEDIUM, AND INTEGRATED CIRCUIT

TECHNICAL FIELD

The present invention relates to telecommunications devices such as personal computers and cellular telephones, to terminals of home information appliances and the like such as television receivers provided with internet access functions, and to security modules built into such terminals. In particular, when the terminal software is composed of a plurality of software modules, and these software modules are updatable, the present invention prevents improper activity such as exchanging the modules with modules that operate improperly or improperly restoring the software to an older version. The present invention makes it possible to boot up stably and reliably with the proper software configuration.

BACKGROUND ART

In recent years, services provided over a network have grown to include provision of copyrighted works such as music and videos, viewing of classified material retained by corporations, online banking, etc. The value of the information contained in these services has also become considerably high. To accommodate this wide range of services, a plurality of software modules are installed on personal computers, portable terminals, cellular telephones, terminals of digital home appliances, etc. Such software modules include, for example, BIOS (Basic Input/Output System), OS (Operating System), communications modules that make it possible to communicate with the outside via communications protocols such as TCP/IP (Transmission Control Protocol/Internet Protocol), etc., as well as applications and the like.

Legitimate software modules need to be booted in a predetermined order, and a mechanism for preventing improper activities such as manipulating the software modules is installed in the terminals. One example of such a mechanism is having a provider issue a certificate for each software module. When each software module is booted, the integrity of the software module is verified using the certificate. This mechanism is also effective when updating an entire software module: as the provider of the software module provides a certificate for the software module along with the software module, it is possible to verify the integrity of the new software module.

Similar technology to this mechanism for preventing improper action using a certificate is disclosed, for example, in Patent Document 1.

Furthermore, the Trusted Computing Group (TCG) has been established for the purpose of developing and spreading a secure computer platform. The TCG uses a security core module called a Trusted Platform Module (TPM) to create a safe terminal environment (Cf. Non-Patent Documents 1-5).

Patent Document 1: US2005/0021968
Non-Patent Document 1: TPM Main, Part 1 Design Principles, Specification Version 1.2 Level 2, Revision 103 (9 Jul. 2007).
Non-Patent Document 2: TPM Main, Part 2 Structures, Specification Version 1.2 Level 2, Revision 103 (9 Jul. 2007).
Non-Patent Document 3: TPM Main, Part 3 Commands, Specification Version 1.2 Level 2, Revision 103 (9 Jul. 2007).
Non-Patent Document 4: TCG Mobile Trusted Module Specification Version 1.0, Revision 1 (12 Jun. 2007).
Non-Patent Document 5: TCG Mobile Reference Architecture Specification Version 1.0, Revision 1 (12 Jun. 2007).

DISCLOSURE OF THE INVENTION

The Problems the Invention is Going to Solve

However, as shown in FIG. 17, with conventionally proposed technology, problems occur when the terminal software is comprised of a plurality of software modules.

Conventionally, each module is verified and booted as in FIG. 17. Boot processing is performed by verifying and booting in the order of the numbers shown in FIG. 17; verification of BIOS, booting of BIOS, verification of OS, booting of OS, verification of communication module, booting of communication module.

When the OS and certificate have been switched with an old OS that has some kind of problem and with an old certificate, however, even though the OS certificate is old, the signature and the like given to the certificate are correct, and thus the old module passes undetected, the communication module is subsequently booted, and boot processing ends up being completed as usual.

Furthermore, when updating a software module, it is necessary to update both the code image of the software module and the corresponding certificate. Thus, problems occur when the power is cut off, etc., after the certificate has been updated but before the code image has been updated. As the updated certificate and the non-updated code image do not conform, a verification error occurs, and as boot processing cannot properly be completed, the terminal cannot be booted.

It is an object of the present invention to solve problems such as these in the prior art by providing a terminal that prevents improper activity such as switching the modules with old modules when the terminal software is composed of a plurality of software modules, wherein it is possible to update each module individually, and wherein boot processing can be performed stably and reliably even when the power is cut off, etc., during an update, as well as providing a security module built into the terminal.

Means to Solve the Problems

The above-described object is fulfilled by a secure boot terminal, one embodiment of the present invention, that boots a plurality of software modules in a predetermined boot order, the secure boot terminal comprising: a first storage unit storing a digital certificate for each software module in the plurality of software modules, the digital certificate including (i) a target digest value that should be calculated as a digest value of the software module, and (ii) a target cumulative value that should be obtained when the target digest values of other software modules booted prior to the software module are calculated cumulatively; a verification unit operable to verify, for a next software module in the predetermined boot order, validity of other software modules booted prior to the next software module by comparing an actual cumulative value, which is obtained by cumulative calculation of digest values of each software module booted prior to the next software module, with a target cumulative value included in a digital certificate corresponding to the next software module; an update unit operable to update one software module from among the plurality of software modules as well as a digital certificate corresponding to the one software module; a second storage unit storing an alternate cumulative value obtained by cumulative calculation of target digest values of each of the other software modules, the cumulative calculation using (i) when a digital certificate has been updated, a target digest value included in a digital certificate prior to updating, or (ii) when a digital certificate has not been updated, a target digest value included in the digital certificate; and a boot control unit operable (i) when verification of validity by the verification unit is successful, to boot the next software module, and (ii) when verification of validity by the verification unit fails, to compare an alternate cumulative value with a target cumulative value included in the digital certificate corresponding to the next software module, and when the alternate cumulative value and the target cumulative value match, to boot the next software module.

Effects of the Invention

A secure boot terminal, one embodiment of the present invention, with the above-described structure above can ensure conformity even when the code image and the digital certificate do not conform because of, for example, the power being cut off during an update of the digital certificate or the software module, by executing the old software module and using the alternate cumulative value without calculating the cumulative value and can thus complete boot processing.

BRIEF DESCRIPTION OF THE DRAWINGS

FIG. 15A shows an example of the structure of a certificate for a program module in the terminal before updating.

FIG. 15B shows an example of the structure of a certificate for a program module when updating of a software module in the terminal is complete.

FIG. 15C shows an example of the structure of a certificate for a program module when updating of the software module in the terminal is incomplete.

DESCRIPTION OF CHARACTERS

Figure 1:
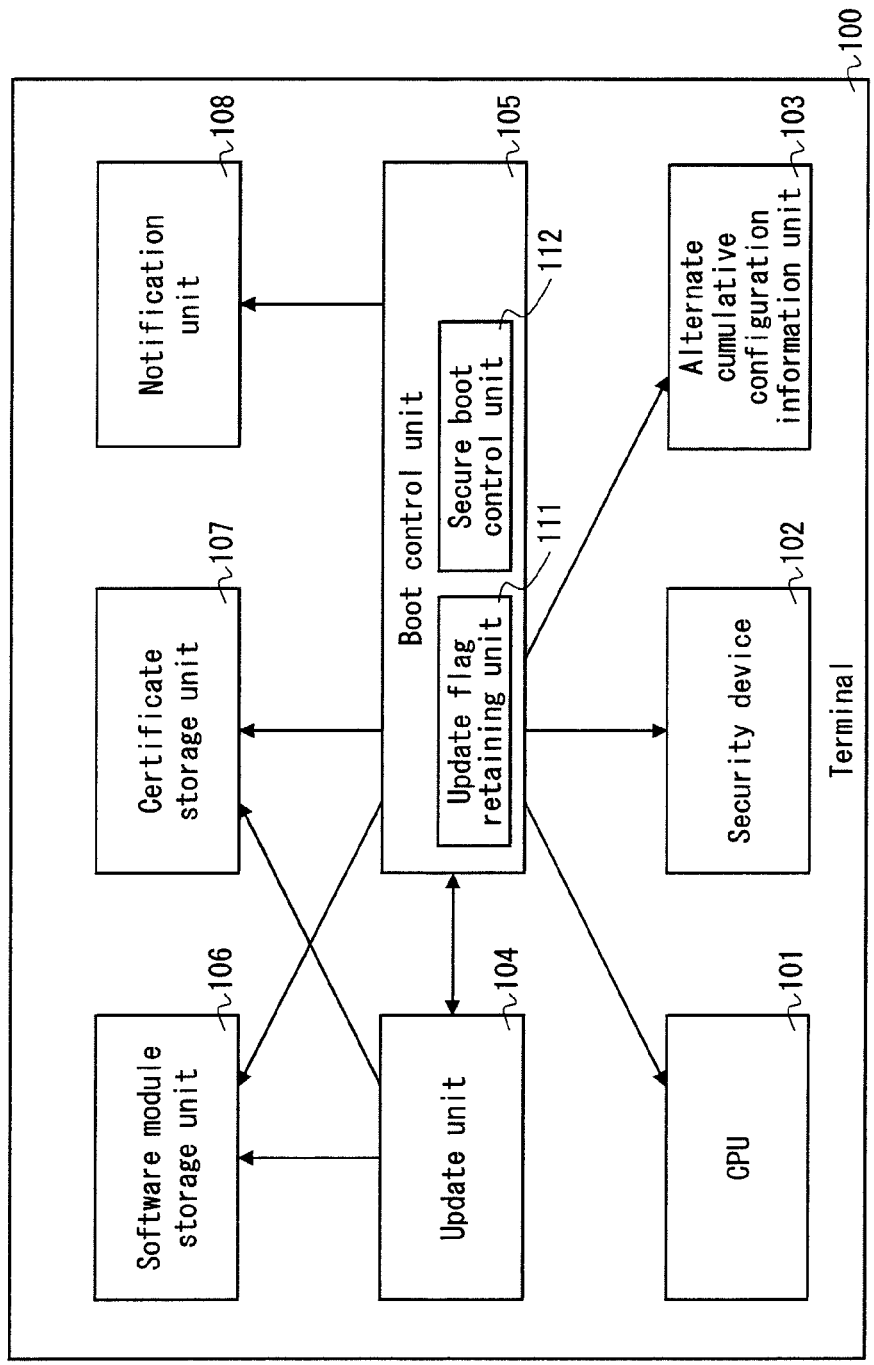
FIG. 1 is a block diagram showing the structure of the terminal in Embodiment 1 of the present invention.

100 Terminal
101 CPU
102 Security device
103 Alternate cumulative configuration information unit
104 Update unit
105 Boot control unit
106 Software module storage unit
107 Certificate storage unit
108 Notification unit

BEST MODE FOR CARRYING OUT THE INVENTION

A secure boot terminal, one embodiment of the present invention, that boots a plurality of software modules in a predetermined boot order, comprises: a first storage unit storing a digital certificate for each software module in the plurality of software modules, the digital certificate including (i) a target digest value that should be calculated as a digest value of the software module, and (ii) a target cumulative value that should be obtained when the target digest values of other software modules booted prior to the software module are calculated cumulatively; a verification unit operable to verify, for a next software module in the predetermined boot order, validity of other software modules booted prior to the next software module by comparing an actual cumulative value, which is obtained by cumulative calculation of digest values of each software module booted prior to the next software module, with a target cumulative value included in a digital certificate corresponding to the next software module; an update unit operable to update one software module from among the plurality of software modules as well as a digital certificate corresponding to the one software module; a second storage unit storing an alternate cumulative value obtained by cumulative calculation of target digest values of each of the other software modules, the cumulative calculation using (i) when a digital certificate has been updated, a target digest value included in a digital certificate prior to updating, or (ii) when a digital certificate has not been updated, a target digest value included in the digital certificate; and a boot control unit operable (i) when verification of validity by the verification unit is successful, to boot the next software module, and (ii) when verification of validity by the verification unit fails, to compare an alternate cumulative value with a target cumulative value included in the digital certificate corresponding to the next software module, and when the alternate cumulative value and the target cumulative value match, to boot the next software module.

In the secure boot terminal, the update unit, after all software modules have been booted, further updates the digital certificates corresponding to the software modules for which verification by the verification unit failed.

With the above-described structure, even if the power is cut off during an update of a digital certificate or a software module causing the software module's code image and digital certificate not match, after boot processing is finished, update processing of the digital certificate and the software module can be restarted.

The secure boot terminal may further comprise: an update determining unit operable to determine whether or not each of the other software modules has been updated; and an alternate cumulative unit operable to calculate the alternate cumulative value by cumulative calculation of target digest values and to record the alternate cumulative value on the second storage unit, the cumulative calculation using (i) when a software module has been updated, the target digest value included in a digital certificate prior to updating that corresponds to the software module, or (ii) when a software module has not been updated, the target digest value included in a digital certificate that corresponds to the software module.

With the above-described structure, the alternate cumulative value that matches the actual cumulative value when none of the software modules has been manipulated or has an incomplete update can be calculated, and boot processing can be completed without interruption using this alternate cumulative value.

The alternate cumulative unit may further confirm, for the software module that has been updated, whether the digest value calculated from the software module matches a target digest value included in a digital certificate corresponding to the software module, and when the digest value and target digest value match, cumulatively calculates the target digest value included in the digital certificate prior to updating.

With the above-described structure, the next software module to be booted can be booted after confirming that other software modules booted before the next software module were not manipulated, and that updating is complete, thereby allowing for heightened safety.

The alternate cumulative unit may encrypt the alternate cumulative value and store it in the second storage unit.

With the above-described structure, it is possible to prevent the alternate cumulative value from being divulged.

The secure boot terminal may further comprise a notification unit that, when a software module for which verification by the verification unit failed is booted by the boot control unit, is operable to provide notification that the digital certificate corresponding to the software module requires updating.

With the above-described structure, it is possible to improve the chances of completing update processing by notifying a user explicitly that a certificate needs updating and urging the user to execute update processing.

The digital certificate may include restriction information that indicates which functions are to be restricted when verification by the verification unit fails, and the boot control unit may boot software modules for which verification by the verification unit failed in a state with restricted functions, as indicated by the restriction information.

With the above-described structure, if boot processing is performed when update processing has not been completed successfully, by restricting the processing executed after boot processing, it is possible to avoid the danger of allowing software modules with incomplete update processing to execute unreasonable functions.

For example, when the restriction information is set to "restrict processing other than restarting update processing when verification by the verification unit fails," if boot processing is performed when update processing has not been completed successfully, then after boot processing, processing other than restarting update processing will be restricted, and thus update processing will be prioritized, making it possible to complete update processing with a higher degree of certainty and prevent processing other than update processing from being performed.

The secure boot terminal may further comprise a structure storage unit storing, for each software module in the plurality of software modules, (i) a plurality of structures each having a region for storing information indicating the software module, information indicating a current digital certificate corresponding to the software module, and information indicating a digital certificate prior to updating that corresponds to the software module, and (ii) a current structure pointer indicating which structure in the plurality of structures is currently in use, wherein the update unit further includes: an obtaining subunit operable to obtain an updated version of the one software module, as well as an updated version of a digital certificate corresponding to the one software module; a structure update subunit operable to write, in an update structure, which is a structure among the structures corresponding to the one software module not indicated by the current structure pointer, (i) information indicating the updated version of the one software module as the information indicating the software module in the update structure, (ii) information indicating the updated version of the digital certificate corresponding to the one software module as the information indicating a current digital certificate in the update structure, and (iii) information indicating the current digital certificate for the structure indicated by the current structure pointer as the information indicating a digital certificate prior to updating in the update structure; and a pointer changing subunit operable to change the current structure pointer to indicate the update structure.

With the above-described structure, the storage locations of software modules or digital certificates are managed together as structures, and after a software module or a digital certificate needing updating has been updated, the current structure pointer is switched to the structure managing the storage location of the update version of the software module or the update version of the digital certificate. As the executed software module and the utilized digital certificate are switched together, there is no time lag between switching processing as occurs when these are changed separately, and the software module or digital certificate after updating are perfectly safe for use.

The secure boot terminal may further comprise: an obtaining unit operable to obtain an updated version of a digital certificate corresponding to one software module in the plurality of software modules; a preliminary cumulative value generation unit operable to generate a preliminary cumulative value by cumulative calculation of target digest values for each of the other software modules booted prior to the one software module; and a preliminary verification unit operable to verify validity for each of the other software modules booted prior to the one software module by comparing the preliminary cumulative value with a target cumulative value included in an updated version of the digital certificate, wherein when verification by the preliminary verification unit is successful, the update unit further updates a digital certificate corresponding to the one software module using the updated version of the digital certificate.

With the above-described structure, before starting update processing, by verifying whether the code image and certificate for the obtained software module match the certificates not targeted for updating, it is possible to prevent erroneous updating of the terminal to a non-matching configuration and to update the terminal to a software configuration in which the code images and certificates for the software modules definitely match.

A secure boot method, one embodiment of the present invention, used in a secure boot terminal that boots a plurality of software modules in a predetermined boot order, comprises the steps of: storing a digital certificate for each software module in the plurality of software modules, the digital certificate including (i) a target digest value that should be calculated as a digest value of a software module, and (ii) a target cumulative value that should be obtained when the target digest values of other software modules booted prior to the software module are calculated cumulatively; verifying, for a next software module in the predetermined boot order, validity of other software modules booted prior to the next software module by comparing an actual cumulative value, which is obtained by cumulative calculation of digest values of each software module booted prior to the next software module, with a target cumulative value included in a digital certificate corresponding to the next software module; updating one software module from among the plurality of software modules as well as a digital certificate corresponding to the one software module; storing an alternate cumulative value obtained by cumulative calculation of target digest values of each of the other software modules, the cumulative calculation using (i) when a digital certificate has been updated, a target digest value included in a digital certificate prior to updating, or (ii) when a digital certificate has not been updated, a target digest value included in the digital certificate; and (i) when verification of validity by the verification unit is successful, booting the next software module, and (ii) when verification of validity by the verification unit fails, comparing an alternate cumulative value with a target cumulative value included in the digital certificate corresponding to the next software module, and when the alternate cumulative value and the target cumulative value match, booting the next software module.

A secure boot program, one embodiment of the present invention, used in a secure boot terminal that boots a plurality of software modules in a predetermined boot order, comprises the steps of: storing a digital certificate for each software module in the plurality of software modules, the digital certificate including (i) a target digest value that should be calculated as a digest value of a software module, and (ii) a target cumulative value that should be obtained when the target digest values of other software modules booted prior to the software module are calculated cumulatively; verifying, for a next software module in the predetermined boot order, validity of other software modules booted prior to the next software module by comparing an actual cumulative value, which is obtained by cumulative calculation of digest values of each software module booted prior to the next software module, with a target cumulative value included in a digital certificate corresponding to the next software module; updating one software module from among the plurality of software modules as well as a digital certificate corresponding to the one software module; storing an alternate cumulative value obtained by cumulative calculation of target digest values of each of the other software modules, the cumulative calculation using (i) when a digital certificate has been updated, a target digest value included in a digital certificate prior to updating, or (ii) when a digital certificate has not been updated, a target digest value included in the digital certificate; and (i) when verification of validity by the verification unit is successful, booting the next software module, and (ii) when verification of validity by the verification unit fails, comparing an alternate cumulative value with a target cumulative value included in the digital certificate corresponding to the next software module, and when the alternate cumulative value and the target cumulative value match, booting the next software module.

In a recording medium, one embodiment of the present invention, for recording a secure boot program used in a secure boot terminal that boots a plurality of software modules in a predetermined boot order, the secure boot program comprises the steps of: storing a digital certificate for each software module in the plurality of software modules, the digital certificate including (i) a target digest value that should be calculated as a digest value of a software module, and (ii) a target cumulative value that should be obtained when the target digest values of other software modules booted prior to the software module are calculated cumulatively; verifying, for a next software module in the predetermined boot order, validity of other software modules booted prior to the next software module by comparing an actual cumulative value, which is obtained by cumulative calculation of digest values of each software module booted prior to the next software module, with a target cumulative value included in a digital certificate corresponding to the next software module; updating one software module from among the plurality of software modules as well as a digital certificate corresponding to the one software module; storing an alternate cumulative value obtained by cumulative calculation of target digest values of each of the other software modules, the cumulative calculation using (i) when a digital certificate has been updated, a target digest value included in a digital certificate prior to updating, or (ii) when a digital certificate has not been updated, a target digest value included in the digital certificate; and (i) when verification of validity by the verification unit is successful, booting the next software module, and (ii) when verification of validity by the verification unit fails, comparing an alternate cumulative value with a target cumulative value included in the digital certificate corresponding to the next software module, and when the alternate cumulative value and the target cumulative value match, booting the next software module.

An integrated circuit, one embodiment of the present invention, that boots a plurality of software modules in a predetermined boot order, comprises: a first storage unit storing a digital certificate for each software module in the plurality of software modules, the digital certificate including (i) a target digest value that should be calculated as a digest value of the software module, and (ii) a target cumulative value that should be obtained when the target digest values of other software modules booted prior to the software module are calculated cumulatively; a verification unit operable to verify, for a next software module in the predetermined boot order, validity of other software modules booted prior to the next software module by comparing an actual cumulative value, which is obtained by cumulative calculation of digest values of each software module booted prior to the next software module, with a target cumulative value included in a digital certificate corresponding to the next software module; an update unit operable to update one software module from among the plurality of software modules as well as a digital certificate corresponding to the one software module; a second storage unit storing an alternate cumulative value obtained by cumulative calculation of target digest values of each of the other software modules, the cumulative calculation using (i) when a digital certificate has been updated, a target digest value included in a digital certificate prior to updating, or (ii) when a digital certificate has not been updated, a target digest value included in the digital certificate; and a boot control unit operable (i) when verification of validity by the verification unit is successful, to boot the next software module, and (ii) when verification of validity by the verification unit fails, to compare an alternate cumulative value with a target cumulative value included in the digital certificate corresponding to the next software module, and when the alternate cumulative value and the target cumulative value match, to boot the next software module.

With the above-described structure, even if, during updating of a digital certificate or software module, the power is cut off or the update is otherwise interrupted, causing the software module's code image and digital certificate not to match, it is possible to execute the old software module, ensure conformity by using the alternate cumulative value rather than the cumulative value, and complete boot processing.

Embodiments of the present invention are described below with reference to the attached drawings.

Embodiment 1

The following is a description of the structure of the terminal 100 in Embodiment 1 of the present invention.

As shown in FIG. 1, the terminal 100 comprises a CPU 101; a security device 102 provided with tamper resistance; a software module storage unit 106 storing the code images for the software modules that the CPU 101 executes; a certificate storage unit 107 that stores certificates for software modules; an update unit 104 that updates the software modules stored in the software module storage unit 106 and the certificates stored in the certificate storage unit 107; an alternate cumulative configuration information unit 103 that shows the configuration information for the software configuration of a software module before updating; a boot control unit 105 that controls the boot processing of the terminal 100; and a notification unit 108 that notifies the user of the terminal 100 of the boot processing status.

The boot control unit 105 includes an update flag retaining unit 111 that retains an update flag showing the update status for each certificate and a secure boot control unit 112 that controls the actual processing sequence for secure boot processing.

The alternate cumulative configuration information unit 103, the update unit 104, and the boot control unit 105 are concretely actualized via dedicated hardware, or software executed by the CPU 101, that perform the operations explained below in further detail. When actualized via software, the units are generated as software object data in the memory (not shown) in the terminal 100. In this case, in particular the update flag retaining unit 111 is actualized in nonvolatile memory.

The software module storage unit 106 and the certificate storage unit 107 are concretely actualized by nonvolatile memory, by a hard disk, or by another recording apparatus.

The notification unit 108 is concretely actualized as a display, a speaker, an LED or other indicator, etc.

Figure 2:
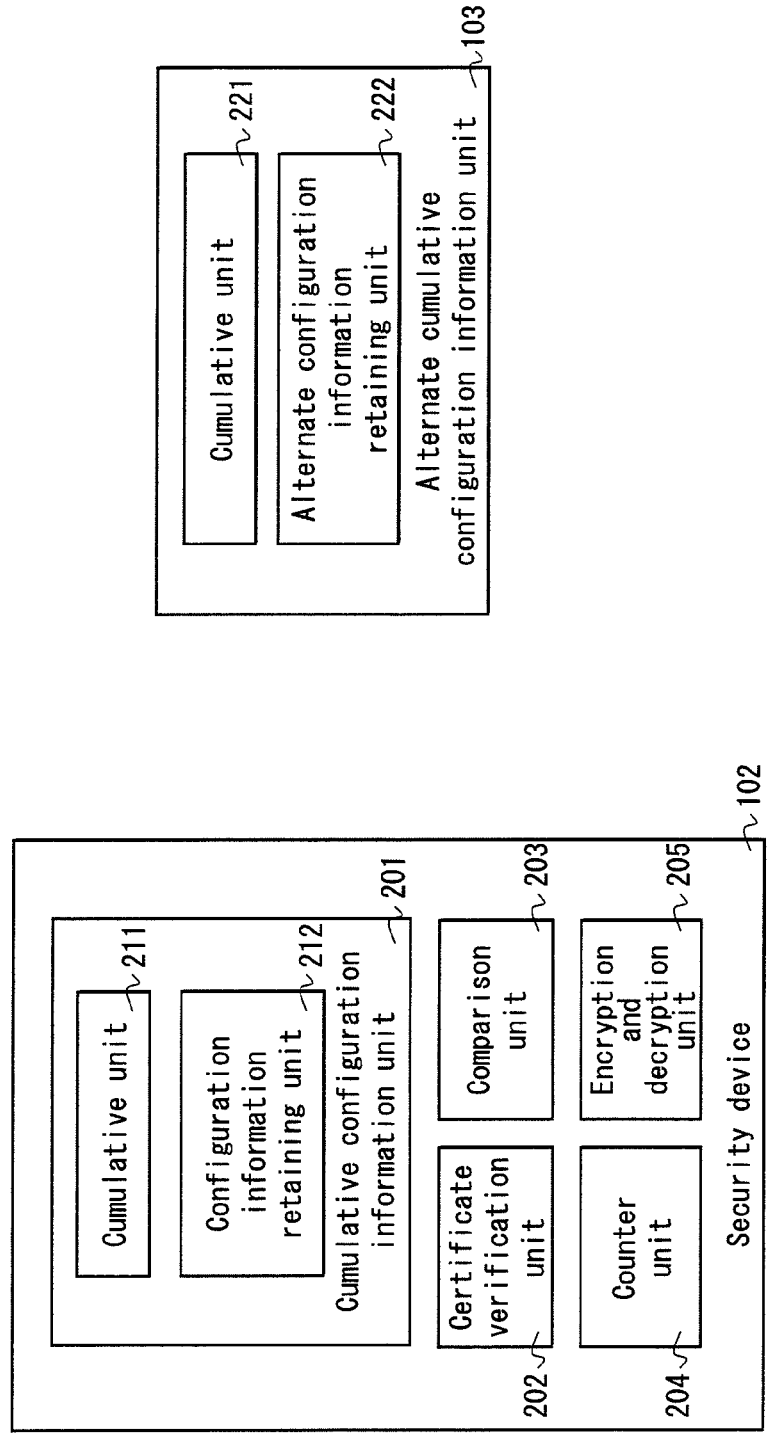
FIG. 2A is a block diagram showing the structure of the security device in the terminal in Embodiment 1 of the present invention.
FIG. 2B is a block diagram showing the structure of the alternate cumulative configuration information unit in the terminal in Embodiment 1 of the present invention.

Furthermore, as shown in FIG. 2A, the security device 102 comprises a cumulative configuration information unit 201 that retains configuration information showing the configuration of the software modules actually executed by the CPU 101; a certificate verification unit 202 that verifies the validity of a software module's certificate; a comparison unit 203 that compares the configuration information retained by the cumulative configuration information unit 201 with the comparison value in a certificate; a counter unit 204 that retains a counter value showing the lower limit of a software module's valid version; an encryption and decryption unit 205 that encrypts and decrypts data and generates and verifies signatures. The cumulative configuration information unit 201 comprises a cumulative unit 211 that performs cumulative calculation of the hash values for software modules and a configuration information retaining unit 212 that retains the cumulative value (hereinafter, the results of cumulative calculation are referred to in this way) calculated by the cumulative unit 211.

The encryption and decryption unit 205 retains a plurality of key data for encrypting and decrypting data and generating and verifying signatures. The alternate cumulative configuration information unit 103 is encrypted via the key data retained by the encryption and decryption unit 205 to prevent it from being manipulated.

The cumulative unit 211 combines the byte array for the value retained by the configuration information retaining unit 212 with the byte array for the results of hash calculation for the software module. The cumulative unit 221 then further performs hash calculation on the combined byte array, storing the results in the configuration information retaining unit 212.

The alternate cumulative configuration information unit 103 has the same composition as the cumulative configuration information unit 201, and as shown in FIG. 2B, it comprises a cumulative unit 221 that performs cumulative calculation of the hash values for software modules in the software configuration before updating and an alternate configuration information retaining unit 222 that retains the cumulative value calculated by the cumulative unit 221.

The cumulative unit 221 combines the byte array for the value retained by the alternate configuration information retaining unit 222 with the byte array, for the results of hash calculation for the software module. The cumulative unit 221 then further performs hash calculation on the combined byte array, storing the results in the alternate configuration information retaining unit 222. In this case, for example, if the value retained by the alternate configuration information retaining unit 222 is 20 bytes, and the results of hash calculation for the software module is 20 bytes, then the combined byte array is a byte array of 40 bytes.

Figure 3:
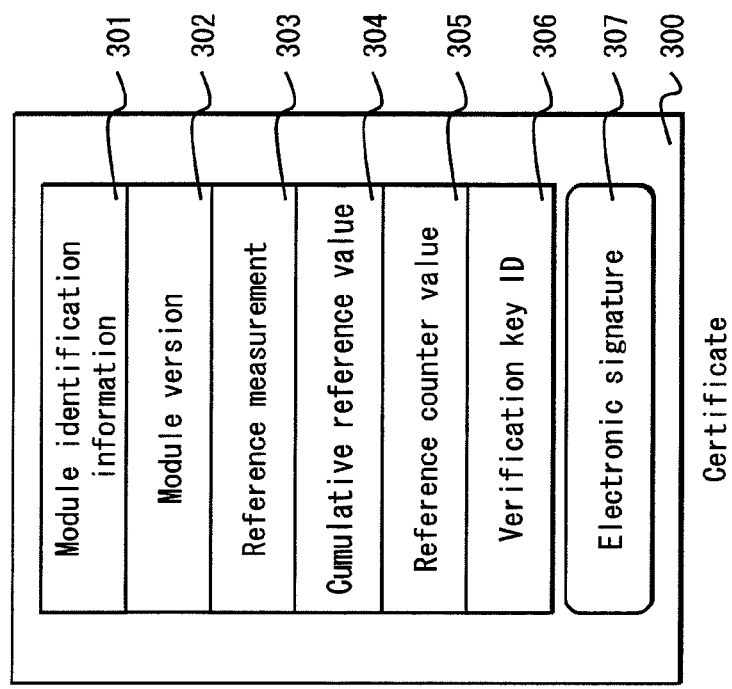
FIG. 3 shows the data structure of a certificate for a software module in Embodiment 1 of the present invention.

FIG. 3 shows the data structure of a certificate. The certificate consists of identification information 301 for the software module corresponding to the certificate, the software module's version 302, a reference measurement 303 showing the value when a software module's code image is hashed as a digest of the module, a cumulative reference value 304 showing the cumulative value that should be stored in the cumulative configuration information unit 201 in the security device 102 for the terminal 100's state before the software module is executed, a reference counter value 305 showing the software module's version, a verification key ID 306 showing a key to verify the certificate, and an electronic signature 307 produced by a secret key corresponding to the key shown by the verification key ID 306.

The reference measurement 303 is a hash value for a legitimate software module's code image, and by comparing it with the results of hash calculation of the actual software module's code image, it is possible to verify correspondence between the certification and the software module. The cumulative reference value 304 is used to verify that the state of the software module before execution is a proper state (the software module executed previously is a valid software module and was executed in the proper order) by comparing this value with the configuration information stored in the cumulative configuration information unit 201 in the security device 102.

Next, the operations of the terminal 100 are described.

Figure 12:
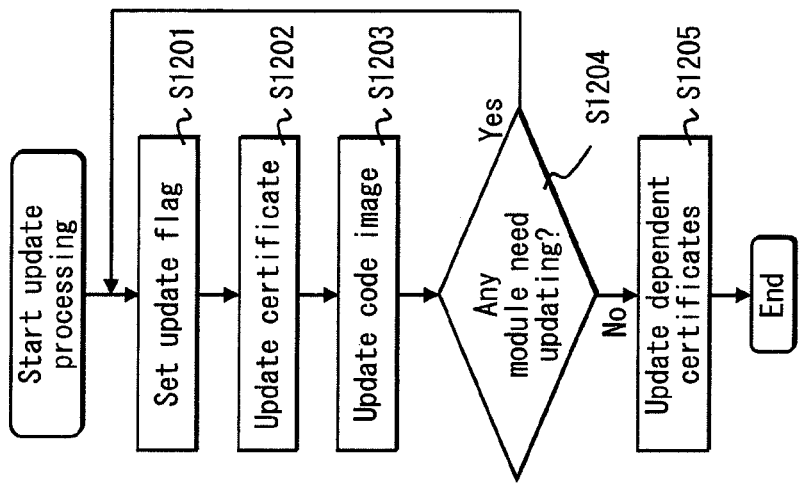
FIG. 12 is a flowchart of update processing in Embodiments 1 through 5 of the present invention.

First, using FIG. 12, operations for update processing in the terminal 100 to update the code images for the software modules stored in the software module storage unit 106 and the certificates stored in the certificate storage unit 107 are described.

The code images and certificates for the latest software modules, along with an update list file listing the code images and certificates for the software modules to be updated, are temporarily retained in a storage region in the update unit 104 by a download via a network communication unit (not shown) or by a storage medium (not shown). Concretely, for one software module to be updated, the code image and certificate for that software module, along with the update list file and the certificates whose cumulative reference value 304 depends on the software module to be updated, are retained in the storage area in the update unit 104.

The update list file is a file provided along with the code image and certificate for a software module, depending on the provider of the software module.

In the update list file, identification information for the software module's certificate and identification information for the code image are listed sequentially in the order update processing is to be performed. This order obeys the order of software modules executed first during secure boot processing, and the sooner a software module is executed, the sooner that software module's certificate and code image are listed for update processing to be performed.

When a plurality of software modules are to be updated, the update list file is retained in the storage area in the update unit 104, along with, for each software module, the code image and certificate, as well as the certificates whose cumulative reference value 304 depends on the software module to be updated.

Even when the certificate's cumulative reference value 304 does not depend on the software module to be updated, the update list file, along with the code image and certificate for each module, are retained in the storage area in the update unit 104.

Downloading of the code image and the certificate for the latest software module is performed as follows. First, the update unit 104 accesses the software module provider's site and confirms whether the latest software module's code image and certificate have been registered. When they have been registered, they are downloaded automatically. Downloading can also be performed by having the terminals' users access the software module provider's site and perform downloads manually.

FIG. 12 shows a flowchart of the update processing which the terminal 100 carries out when the code image and certificate for the latest software module to be updated are retained in the update unit 104. The update unit 104 can be made to start update processing automatically when the code image and certificate for the latest software module to be updated are stored in the update unit 104, or update processing can be made to start in accordance with a user operation to start update processing.

Figure 16:
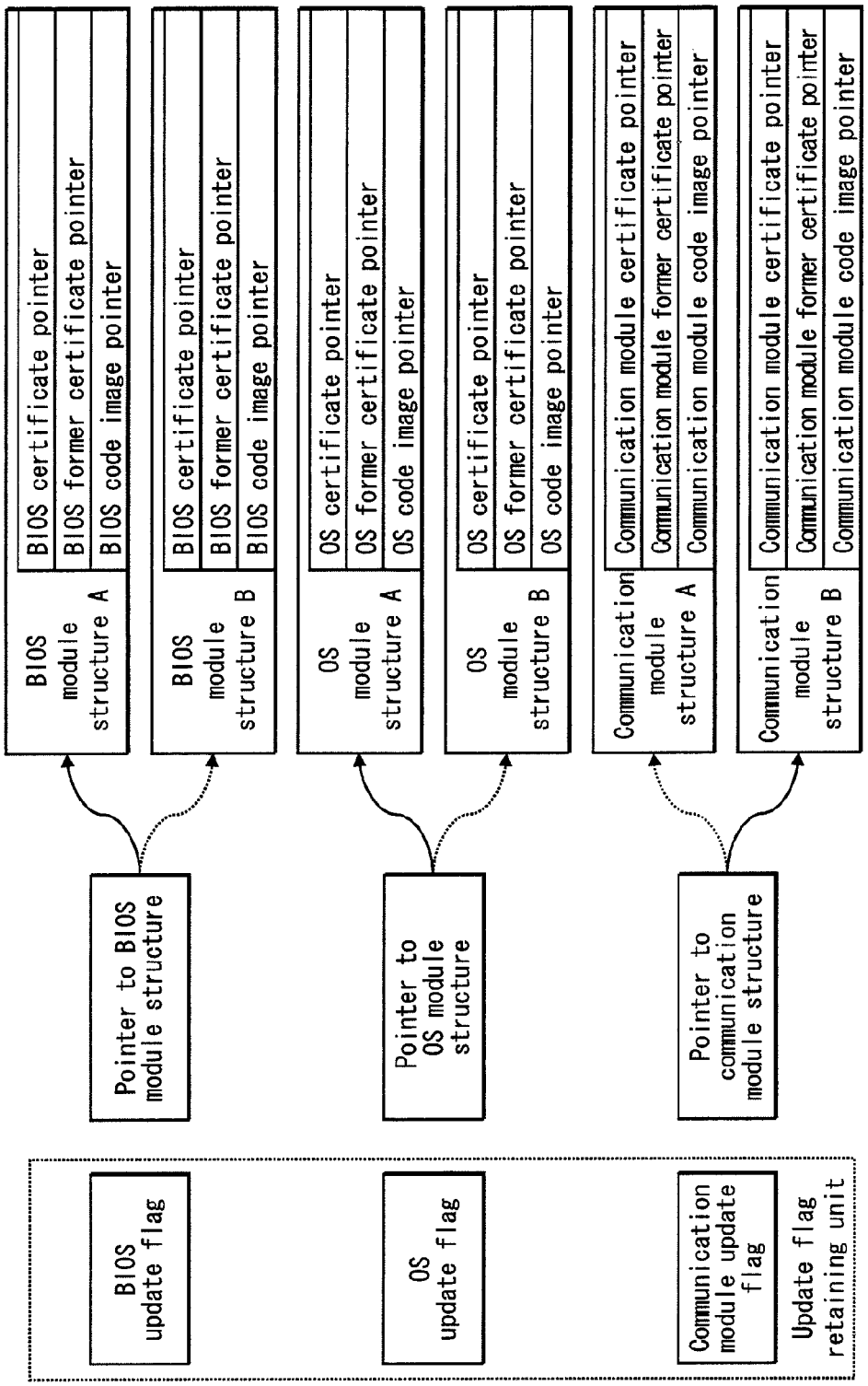
FIG. 16 schematically shows an example of data stored inside a boot control unit in Embodiments 1 through 6 of the present invention.
Figure 17:
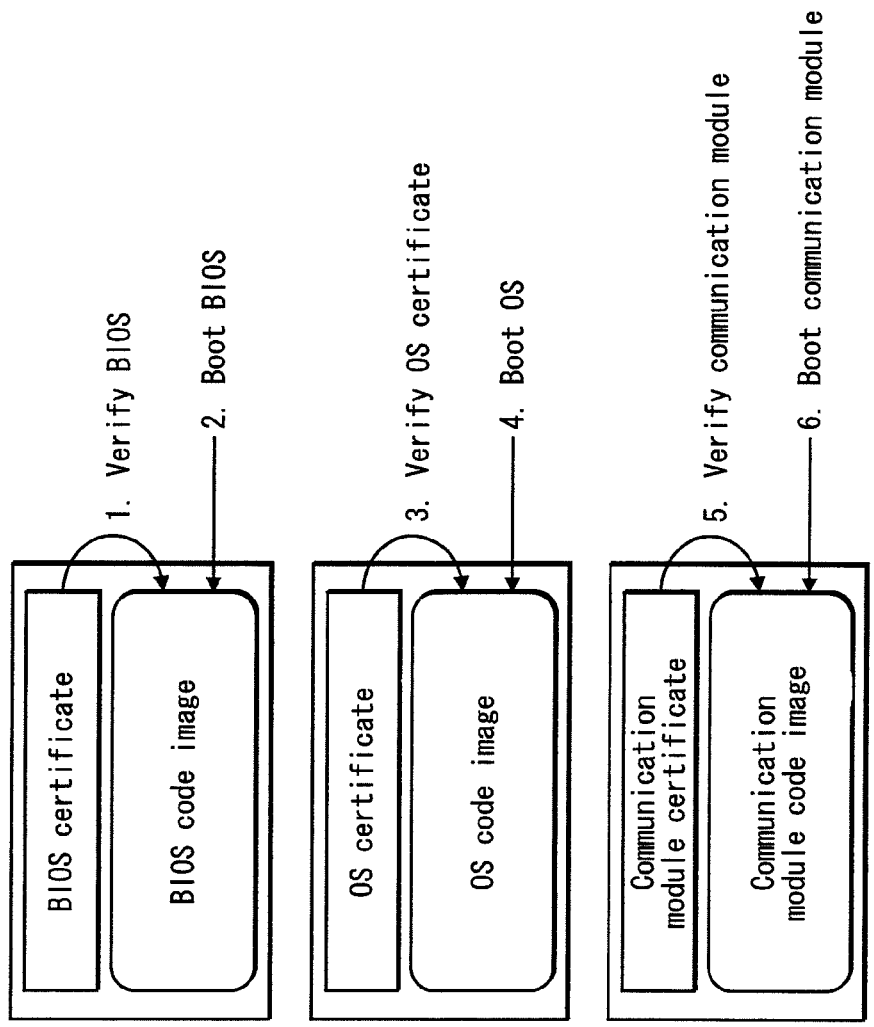
FIG. 17 describes an example of boot processing based on the prior art.

FIG. 16 shows an example of data stored inside the boot control unit 105. In the present embodiment, for each software module, an update flag, module structure A and module structure B which manage pointers to the code image, certificate, and former certificate (the old certificate for before update processing), as well as a pointer to the module structure are retained. FIG. 16 shows the data retained in the boot control unit 105 for three software modules: BIOS, OS, and a communication module.

The pointer to the module structure is set to point either to module structure A or to module structure B.

In the present embodiment, the module structure is used to manage the latest certificate and the former certificate for each software module (BIOS, OS, communication module). In the present embodiment, there are two module structures, one of which is used for updating. The other is a structure including pointers to the software module itself and the certificate for the current software configuration, and is used for booting the software module. When a software module is updated in the present embodiment, pointers to the actual code image and certificate for the new software module are stored in the structure for updating (i.e., the structure not currently being used). Afterwards, the module structure is completely updated by switching the pointers to each module structure from the structure currently being used to the structure for updating. In other words, since the module structure currently being used is switched with the module structure for updating, the module structure for updating turns into the module structure currently being used.

When the only modules that are updated are modules booted prior to a software module corresponding to a module structure, the actual code image for this software module is not updated, but its certificate may need to be updated. This is because the certificate for the software module may be affected by modules booted before the software module corresponding to the certificate. Therefore, in this case as well, pointers for the module structure for updating are set to the same code image as before updating, the certificate after updating, and the latest certificate before updating (the former certificate after updating). Afterwards, the module structure for updating and the module structure currently being used are switched to complete updating of the module structure. Details about these operations are provided below.

In FIG. 12, the update unit 104 first sets the update flag corresponding to the software module to be updated (step S1201).

Next, the update unit 104 updates the software module's certificate (step S1202). At this time, the certificate before updating stored in the certificate storage unit 107 is not erased from the certificate storage unit 107, but rather is handled as a former certificate in the boot control unit 105.

To prevent a certificate from being switched with an old certificate, the update unit 104 sends an order to the security device 102. Having received the order, when updating the certificate the security device 102 sets the certificate's reference counter value 305 to the counter value retained in the counter unit 204 in the security device 102 incremented by one. The security device then generates a signature via the encrypting key retained in the encryption and decryption unit 205 in the security device 102 and sets the digital signature 307 field to this signature.

At this time, in accordance with a request from the update unit 104, the boot control unit 105 sets the pointers to the certificate for the module structure opposite to the one indicated by the pointers to the module structure to the updated certificate in the certificate storage unit 107 (i.e., when the pointers to the module structure indicate module structure A, the pointers are set to module structure B, and vice-versa). The pointers to the former certificate for the opposite module structure are set to the certificate for the module structure currently indicated by the pointers to the module structure.

Next, the update unit 104 updates the code image for the software module stored in the software module storage unit 106 (step S1203). At this time, in accordance with a request from the update unit 104, the boot control unit 105 sets the pointers to the code image for the module structure opposite to the one indicated by the pointers to the module structure to the updated code image in the software module storage unit 106. Furthermore, the pointers to the module structure pointers are set to the opposite module structure, and usage in the secure boot processing is switched over to the updated certificate and code image.

Next, following the order in the update list file, the update unit 104 determines whether or not another software module that needs updating exists (step S1204). When no such module exists, processing proceeds to step S1205. When a module to be updated does exist, processing returns to step S1201, and the processing between steps S1201 and S1204 is repeated.

In step S1205, the update unit 104 updates the certificate when there is a software module whose code image does not need to be updated, but whose certificate needs to be updated as the module depends on another software module whose certificate was updated. The update unit thus finishes update processing. At this time, in accordance with a request from the update unit 104, the boot control unit 105 sets the pointers to the certificate for the module structure opposite to the one indicated by the pointers to the module structure to the updated certificate in the certificate storage unit 107. The pointers to the code image for the opposite module structure are also set to the code image for the module structure indicated by the pointers to the current module structure. Furthermore, the pointers to the former certificate for the opposite module structure also set to the certificate for the module structure indicated by the pointers to the current module structure. Finally, the pointers to the module structure are set to the opposite module structure, and usage in the secure boot processing is switched over to the updated certificate.

For the update processing in step S1205, the update unit 104 carries out the same processing as in step S1202.

Figure 4:
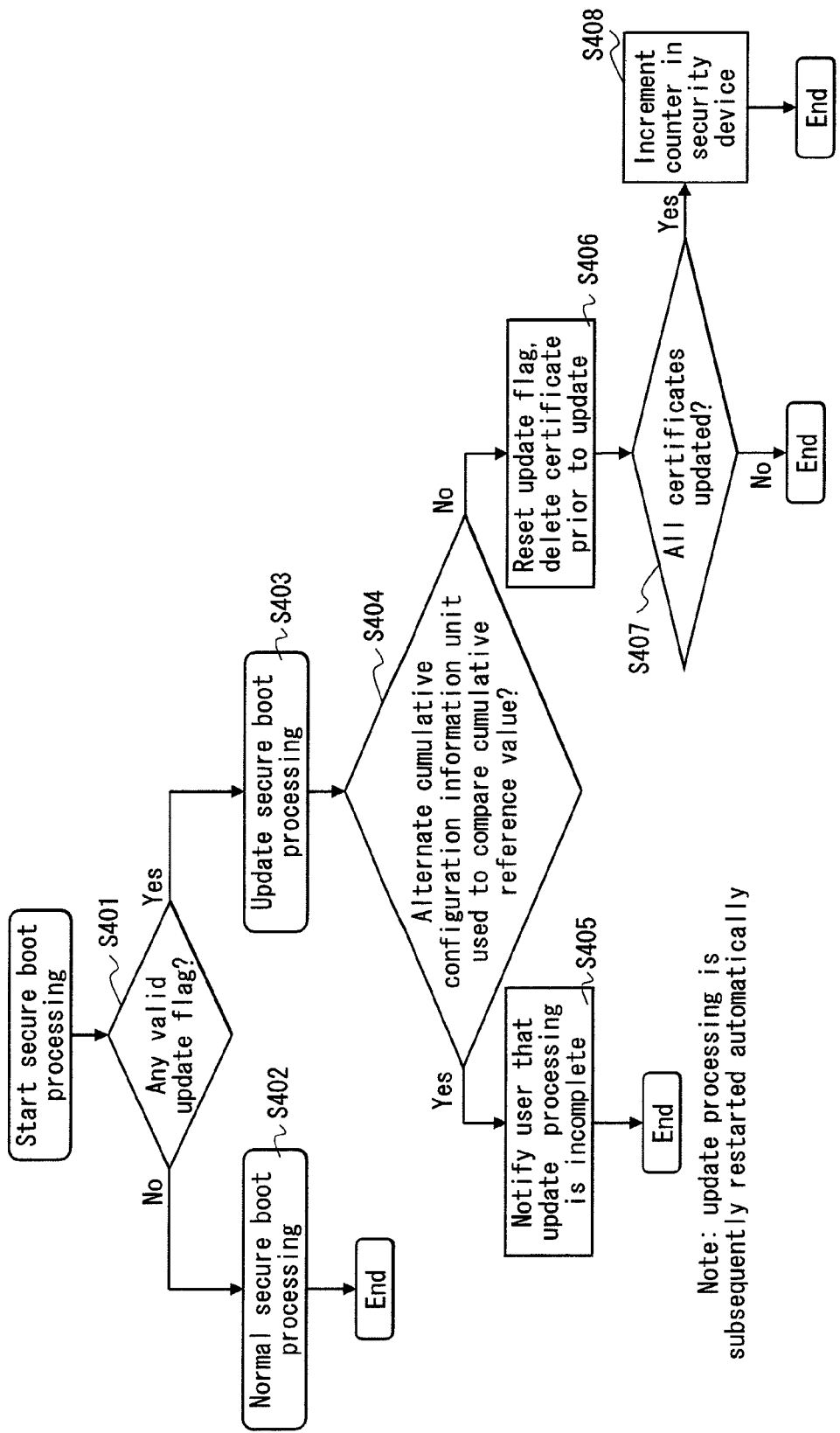
FIG. 4 is a flowchart of secure boot processing in Embodiments 1 and 2 of the present invention.
Figure 5:
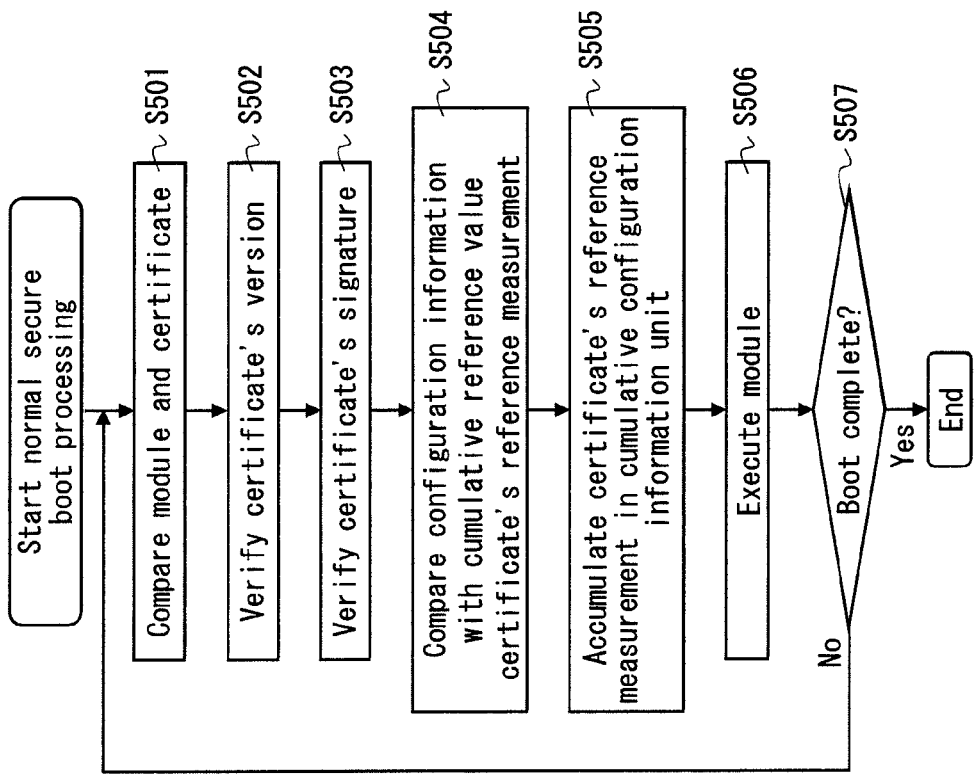
FIG. 5 is a flowchart of normal secure boot processing in Embodiments 1 and 2 of the present invention.
Figure 6:
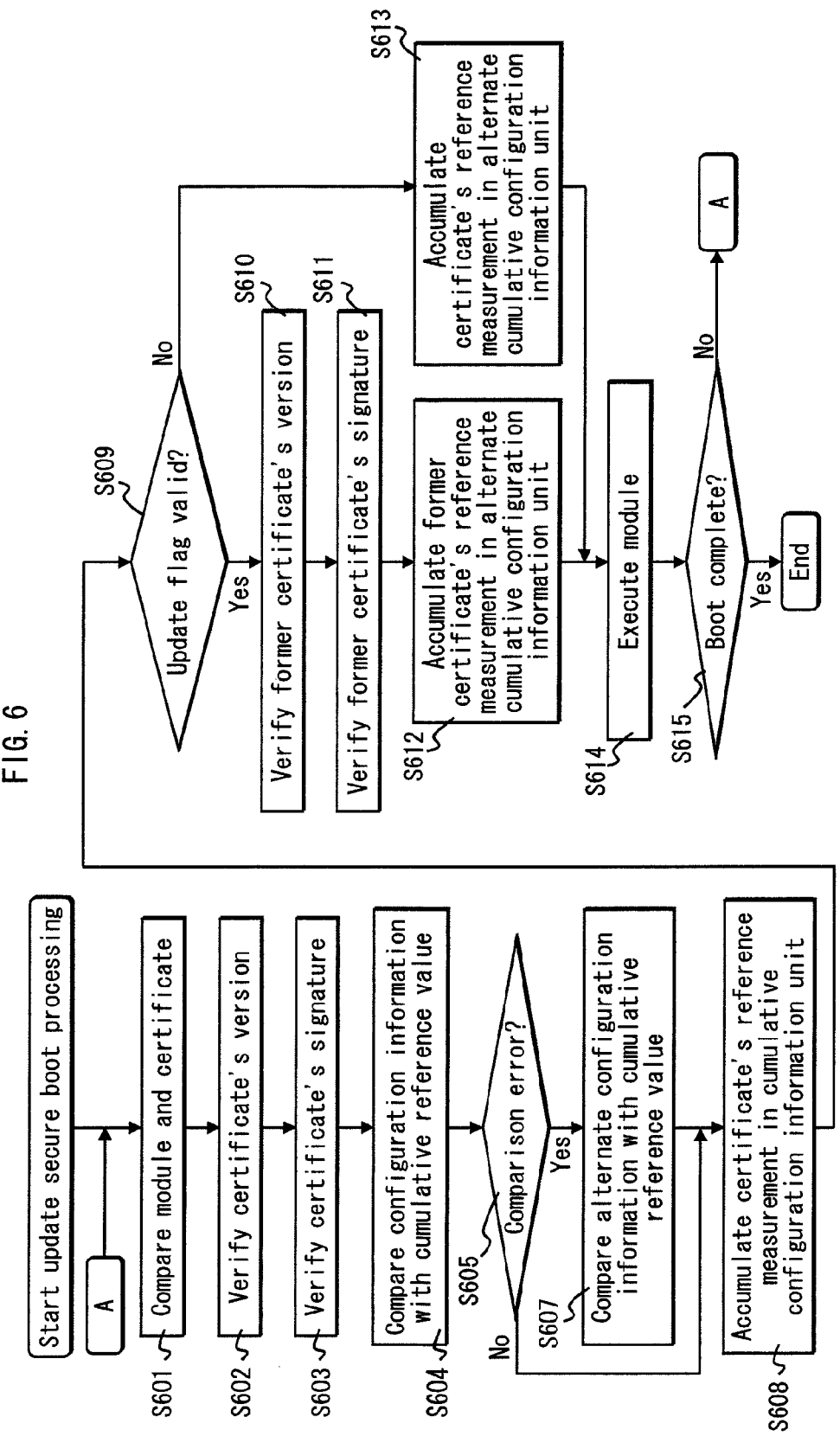
FIG. 6 is a flowchart of secure boot processing during an update in Embodiments 1 and 2 of the present invention.

Next, operations in the terminal 100's secure boot processing are explained using FIGS. 4-6.

FIG. 4 shows a summary of the flow of the secure boot processing that the terminal 100 performs.

First, in step S401, the secure boot control unit 112 refers to the update flag in the update flag retaining unit 111. If any of the update flags is valid, update secure boot processing (step S403) is performed; otherwise, normal secure boot processing (step S402) is performed.

In the case of normal secure boot processing (step 402), the secure boot control unit 112 performs secure boot processing in accordance with the flowchart shown in FIG. 5.

In the case of update secure boot processing (step 403), the secure boot control unit 112 performs secure boot processing in accordance with the flowchart shown in FIG. 6.

First, an explanation of the terminal 100's operations during normal secure boot processing (step S402) is provided.

In normal secure boot processing, the secure boot control unit 112 first compares the software module and the certificate to verify that a certificate corresponding to the software module exists (step S501). Concretely, the unit performs a hash calculation (e.g., SHA-1 hash calculation) on the software module's code image and compares the result with the certificate's reference measurement 303. If the results of this comparison indicate conformity with the reference measurement 303, then the secure boot control unit 112 requests that the security device 102 verify the certificate, and processing proceeds to step S502.

When the results of the hash calculation do not match the reference measurement 303, an error occurs, and secure boot processing terminates before completion. At this point, the secure boot control unit 112 requests that the notification unit 108 notify the user, and the notification unit 108 notifies the user that the software module's code image and the certificate did not match (not shown).

In step S502, the certificate verification unit 202 in the security device 102 verifies the certificate's version, verifying that the certificate is not an old, invalidated certificate (step S502). Concretely, the unit compares the counter value retained by the security device's counter unit 204 with the certificate's reference counter value 305. A counter value indicating the lower limit of the software module's valid version is retained in the counter unit 204, and when the results of comparison with the counter value indicate that the reference counter value 305 is equal to or higher than the counter value retained in the counter unit 204, processing proceeds to step S503.

Otherwise, an error occurs, and secure boot processing terminates before completion. At this point, the secure boot control unit 112 requests that the notification unit 108 notify the user, and the notification unit 108 notifies the user that the software module's code image and certificate are old (not shown).

In step S503, the certificate verification unit 202 in the security device 102 further verifies the certificate's signature, verifying that the certificate has a valid electronic signature (step S503). When the electronic signature is valid, processing proceeds to step S504.

When the electronic signature is invalid, an error occurs, and secure boot processing terminates before completion. At this point, the secure boot control unit 112 requests that the notification unit 108 notify the user, and the notification unit 108 notifies the user that an error was detected in the certificate's electronic signature (not shown).

The verification in steps S501, S502, and S503 indicates that the software module and the certificate correspond to each other, and verification of the validity of the certificate verifies the validity of the software module itself.

In step S504, the comparison unit 203 in the security device 102 compares the certificate's cumulative reference value with the configuration information retained by the configuration information retaining unit 212 to verify that the state of the software module before execution is a proper state (the software module executed previously is a valid software module and was executed in the proper order). When the certificate's cumulative reference value matches the configuration information retained by the configuration information retaining unit 212, processing proceeds to step S505.

Otherwise, an error occurs, and secure boot processing terminates before completion. At this point, the secure boot control unit 112 requests that the notification unit 108 notify the user, and the notification unit 108 notifies the user that the software module's code image and the certificate did not match (not shown).

In step S505, the cumulative unit 211 in the cumulative configuration information unit 201 in the security device 102 combines the byte array for the value retained by the configuration information retaining unit 212 with the byte array for the cumulative reference value set in the certificate's cumulative reference value field. The cumulative unit 221 then further performs hash calculation (e.g. SHA-1 hash calculation) on the combined byte array, storing the results in the configuration information retaining unit 212 (step S505).

Next, in step S506, the secure boot control unit 112 executes the software module, and processing proceeds to step S507.

Step S507 determines whether secure boot processing has been completed or not.

When all of the software modules that need to be executed during secure boot processing have been executed, normal secure boot processing (step S402) is complete. When secure boot processing is determined not to be complete, processing returns to step S501, and the processing between steps S501 and S507 is repeated for the next software module to be executed and its certificate.

Next, an explanation of the terminal 100's operations during update secure boot processing (step S403) is provided. The secure boot control unit 112 performs secure boot processing in accordance with the flowchart shown in FIG. 6.

During update secure boot processing, the secure boot control unit 112 first compares the software module and the certificate to verify that a certificate corresponding to the software module exists (step S601). Concretely, the unit performs a hash calculation (e.g., SHA-1 hash calculation) on the software module's code image and compares the result with the certificate's reference measurement 303. If the results of this comparison indicate conformity with the reference measurement 303, then the secure boot control unit 112 requests that the security device 102 verify the certificate, and processing proceeds to step S602.

When the results of the hash calculation do not match the reference measurement 303, an error occurs, and secure boot processing terminates before completion. At this point, the secure boot control unit 112 requests that the notification unit 108 notify the user, and the notification unit 108 notifies the user that the software module's code image and the certificate did not match (not shown).

In step S602, the certificate verification unit 202 in the security device 102 verifies the certificate's version, verifying that the certificate is not an old, invalidated certificate (step S602). Concretely, the unit compares the counter value retained by the security device's counter unit 204 with the certificate's reference counter value 305. A counter value indicating the lower limit of the software module's valid version is retained in the counter unit 204, and when the results of comparison with the counter value indicate that the reference counter value 305 is equal to or higher than the counter value retained in the counter unit 204, processing proceeds to step S603.

Otherwise, an error occurs, and secure boot processing terminates before completion. At this point, the secure boot control unit 112 requests that the notification unit 108 notify the user, and the notification unit 108 notifies the user that the software module's code image and certificate are old (not shown).

In step S603, the certificate verification unit 202 in the security device 102 further verifies the certificate's signature, verifying that the certificate has a valid electronic signature (step S603). When verification indicates that the electronic signature is valid, processing proceeds to step S604.

When the electronic signature is invalid, an error occurs, and secure boot processing terminates before completion. At this point, the secure boot control unit 112 requests that the notification unit 108 notify the user, and the notification unit 108 notifies the user that an error was detected during verification of the certificate's electronic signature (not shown).

The verification in steps S601, S602, and S603 indicates that the software module and the corresponding certificate correspond properly to each other, and verification of the validity of the certificate verifies the validity of the software module itself.

In step S604, the comparison unit 203 in the security device 102 compares the certificate's cumulative reference value with the configuration information retained by the configuration information retaining unit 212 to verify that the state of the software module before execution is a proper state (the software module executed previously is a valid software module and was executed in the proper order).

The next step, S605, determines whether comparison of the certificate's cumulative reference value with the configuration information retained by the configuration information retaining unit 212 was successful or not.

When the comparison was successful, that is, when the certificate's cumulative reference value and the configuration information retained by the configuration information retaining unit 212 match, verifying that the state of the software module before execution is a proper state, then processing proceeds to step S608.

When the comparison is not successful, that is, when the certificate's cumulative reference value and the configuration information retained by the configuration information retaining unit 212 do not match, then processing proceeds to step S607. The certificate's cumulative reference value is compared with the configuration information retained by the alternate configuration information retaining unit 222 to verify whether or not the certificate's nonconformity error was caused by update processing being incomplete.

In step S607, the secure boot control unit 112 compares the certificate's cumulative reference value with the configuration information retained by the alternate configuration information retaining unit 222 to verify that, for the software configuration of the software module before update processing is performed, the state of the software module before execution is a proper state (however, strictly speaking, the software module's code image and certificate do not match). When the certificate's cumulative reference value matches the configuration information retained by the alternate configuration information retaining unit 222, processing proceeds to step S608.

Otherwise, an error occurs, and secure boot processing terminates before completion. At this point, the secure boot control unit 112 requests that the notification unit 108 notify the user, and the notification unit 108 notifies the user that the software module's code image and the certificate did not match (not shown).

In step S608, the cumulative unit 211 in the cumulative configuration information unit 201 in the security device 102 combines the byte array for the value retained by the configuration information retaining unit 212 with the byte array for the cumulative reference value set in the certificate's cumulative reference value field. The cumulative unit 221 then further performs hash calculation (e.g. SHA-1 hash calculation) on the combined byte array, storing the results in the configuration information retaining unit 212 (step S608).

Next, step S609 determines whether the software module's update flag is valid or not. If the update flag is valid, i.e. if the software module is undergoing update processing or if update processing has been completed, then processing proceeds to step S610. For software modules that have not been updated, processing proceeds to step S613.

In step S613, the cumulative unit 221 in the alternate cumulative configuration information unit 201 combines the byte array for the value retained by the alternate configuration information retaining unit 222 with the byte array for the cumulative reference value set in the certificate's cumulative reference value field. The cumulative unit 221 then further performs hash calculation on the combined byte array, storing the results in the alternate configuration information retaining unit 222 (step S613).

In step S610, the secure boot control unit 112 verifies the version of the former certificate before updating, verifying that the former certificate is a certificate with a version before update processing was performed (step S610). Concretely, the unit compares the counter value retained by the security device's counter unit 204 with the certificate's reference counter value 305. A counter value indicating the lower limit of the software module's valid version is retained in the counter unit 204, and when the results of comparison with the counter value indicate that the reference counter value 305 is equal to or higher than the counter value retained in the counter unit 204, processing proceeds to step S611.

Otherwise, an error occurs, and secure boot processing terminates before completion. At this point, the secure boot control unit 112 requests that the notification unit 108 notify the user, and the notification unit 108 notifies the user that an error was detected during verification of the certificate's version (not shown).

In step S611, the secure boot control unit 112 further verifies the signature of the former certificate from before updating, verifying that the certificate has a valid electronic signature (step S611). When verification indicates that the electronic signature is valid, processing proceeds to step S612.

When the electronic signature is invalid, an error occurs, and secure boot processing terminates before completion. At this point, the secure boot control unit 112 requests that the notification unit 108 notify the user, and the notification unit 108 notifies the user that an error was detected during verification of the certificate's electronic signature (not shown).

The verification in steps S610 and S611 verifies that the former certificate is a valid certificate for the version before update processing was performed.

In step S612, the cumulative unit 221 in the alternate cumulative configuration information unit 201 combines the byte array for the value retained by the alternate configuration information retaining unit 222 with the byte array for the cumulative reference value set in the former certificate's cumulative reference value field. The cumulative unit 221 then further performs hash calculation on the combined byte array, storing the results in the alternate configuration information retaining unit 222 (step S612). In this way, the configuration information for the software configuration before update processing was performed is retained in the alternate configuration information retaining unit 222.

Next, in step S614, the secure boot control unit 112 executes the software module, and processing proceeds to step S615. The latest code image corresponding to the certificate verified in steps S601 through S603 is used as the code image for the software module executed at this point.

In step S615, the secure boot control unit 112 determines whether or not secure boot processing has been finished.

When all of the software modules that need to be executed during secure boot processing have been executed, update secure boot processing (step S403) is complete, and processing proceeds to step S404.

When secure boot processing is determined not to be complete, processing returns to step S601, and the processing between steps S601 and S615 is repeated for the next software module to be executed and its certificate.

In step S404, the secure boot control unit 112 determines whether or not the alternate cumulative configuration information unit was used for comparison of the certificate's cumulative reference value, i.e. whether or not the processing in step S607 was performed.

When the processing in step S607 was performed, the software module and its certificate did not match during update processing, and update processing is not complete. Processing thus proceeds to step S405.

In step S405, the secure boot control unit 112 requests that the notification unit 108 notify the user, and the notification unit 108 notifies the user that update processing is not complete, and secure boot processing thus ends. Afterwards, update processing is restarted automatically.

If the processing in step S607 was not performed, this means that the software module and its certificate matched and were updated. Processing thus proceeds to step S406, the secure boot control unit resets the update flag, and the former certificate from before updating is deleted.

Next, in step S407, the secure boot control unit 112 determines whether all of the certificates have been updated or not. Concretely, the unit determines whether, for all of the software modules executed during secure boot processing, the reference counter value 305 for each certificate stored in the certificate storage unit 107 now shows a larger value than the counter value retained by the counter unit 204 in the security device 102.

When all of the certificates have been updated, to prevent a certificate from being switched with an old certificate, the secure boot control unit 112 requests a counter increment from the security device 102. The security device 102 increments the counter value retained in the counter 204 by one and terminates secure boot processing (step S408). Otherwise, secure boot processing is terminated as is.

By performing secure boot processing as described above, when the software in the terminal 100 is composed of a plurality of software modules, it is possible to prevent improper activity such as switching the software modules with old software modules and to perform update processing for each software module individually. Furthermore, even when the power is cut off during updating of a certificate, causing the software module's code image and certificate not to match, then secure boot processing can be completed without executing the old software module, and the certificate's update processing can be restarted.

The following is offered as a concrete example: the terminal 100's software before updating consists of BIOS, OS, and a communication module, as shown in FIG. 15A, and FIG. 15B shows what the configuration should be when updated. In this case, not only are the OS code image and the OS certificate updated, but also the communication module's certificate, whose cumulative reference value depends on the OS code image and the OS has been updated (in this case, the communication module's code image is not updated).

In this update processing, for example, if a problem such as power being cut off occurs after completion of update processing for the OS code image and the OS certificate but before updating of the communication module certificate is complete, then the resulting configuration is shown in FIG. 15C. The cumulative reference value for the communication module certificate in this state is the value for the presumed software configuration before updating in FIG. 15A, and the updated OS code image (New_OS), the OS certificate', and the communication module certificate end up not matching.

However, as the terminal 100 performs secure boot processing shown in FIGS. 4-6, it can complete secure boot processing and restart the update processing for the communication module certificate.

In the above description, the update flag retaining unit 111 was provided in the boot control unit 105, but it could also be provided in the security device 102. As the security device 102 is provided with tamper resistance, it can prevent the update flag from being manipulated, improving the security of the terminal 100.

The software module's certificate can be encrypted with the key retained by the security device's encryption and decryption unit and stored in the certificate storage unit.

SHA256 can also be used as a hash algorithm for the hash calculation of the software module's code image.

Before starting the secure boot processing, the security device 102 can verify that the boot control unit has not been manipulated.

The latest software module's code image and certificate, as well as the update list file, can be retained in the storage region of the updating unit via a dedicated tool connected to the terminal.

RSA encryption, an elliptic curve cryptosystem, or HMAC can also be used as the algorithm for the electronic signature applied to the certificate.

In the above description, one was added to the certificate's reference counter value, and the counter value shown by the counter unit in the security device was incremented by one, but instead a value A other than one can be added to the certificate's reference counter value, and the counter value shown by the counter unit in the security device can be incremented by that value A.

Embodiment 2

Figure 7:
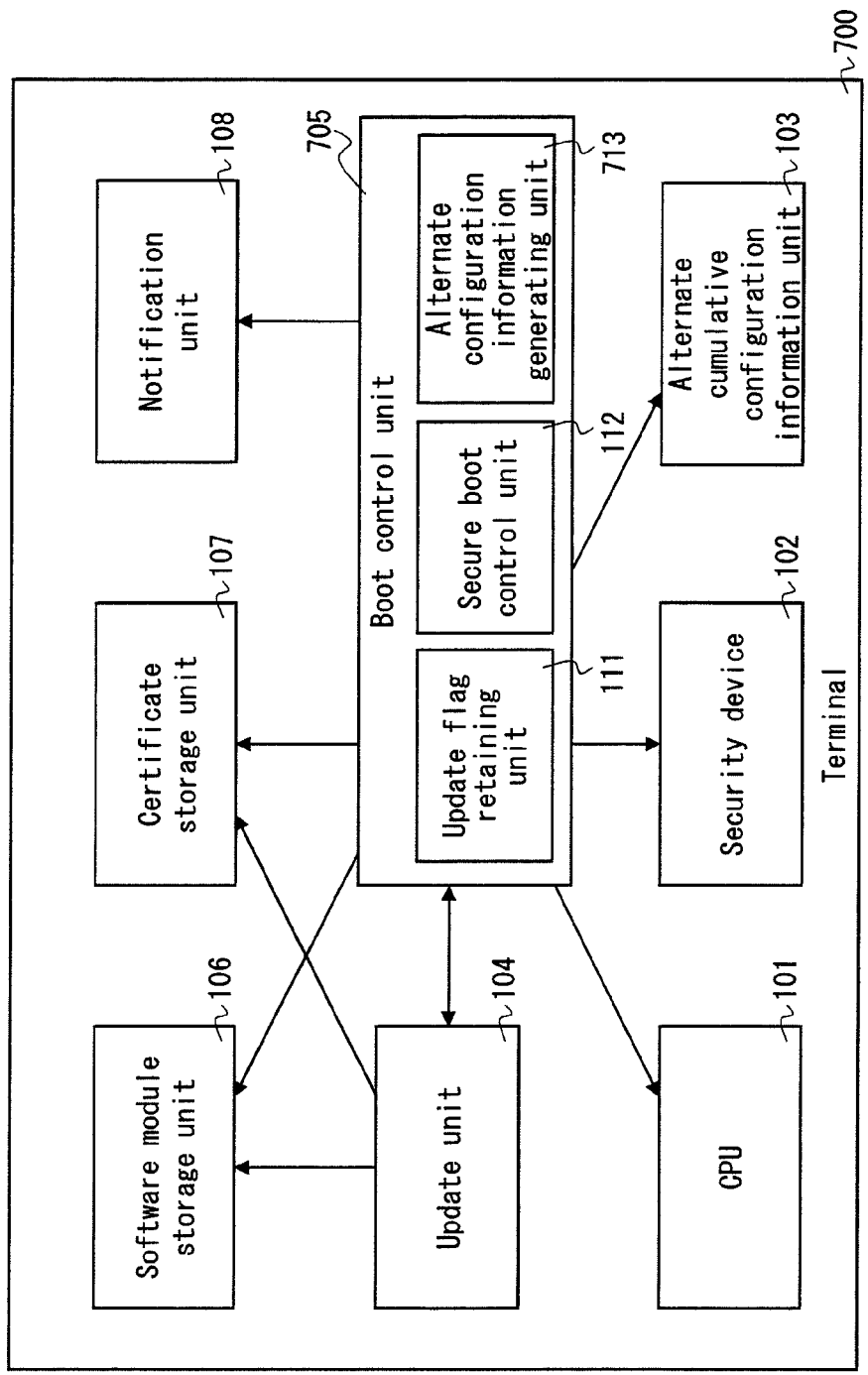
FIG. 7 is a block diagram showing the structure of the terminal in Embodiment 2 of the present invention.

Embodiment 2 of the present invention is now described referring to FIG. 7.

The terminal 700 in Embodiment 2 of the present invention generates an alternate cumulative configuration information unit 103 as necessary, and is constructed so that the terminal 700's resources are used efficiently. The alternate cumulative configuration information unit 103 is actualized by the software executed by the CPU 101 and is generated as software object data in the terminal 700's memory (not shown).

FIG. 7 is a block diagram showing the structure of the terminal 700 in Embodiment 2 of the present invention. In Embodiment 2, the boot control unit 705 is further provided with an alternate configuration information generating unit 713 that generates the alternate cumulative configuration information unit 103 as necessary. The alternate cumulative configuration information unit 103 normally does not exist, and is generated as necessary by the alternate configuration information generating unit 713 when update secure boot processing (step S403) is performed.

Other structural elements are the same as the terminal 100 in Embodiment 1.

In the present embodiment, when update secure boot processing (step S403) starts, the alternate configuration information generating unit 713 reads the value retained in the configuration information retaining unit 212 in the security device 102 and sets the alternate configuration information retaining unit 222 to this value, thereby generating the alternate cumulative configuration information unit 103. Other operations are the same as in the terminal 100 in Embodiment 1.

In the present embodiment, the alternate cumulative configuration information unit 103 is generated by the alternate configuration information generating unit 713 as software object data only when necessary. Otherwise, it does not occupy the terminal 700's memory, and in this way the resources of the terminal 700 can be used effectively, since for example the terminal 700 can use a larger amount of memory to speed up processing during normal secure boot processing.

The alternate configuration information retaining unit 222 in the generated alternate cumulative configuration information unit 103 can be generated in memory with tamper resistance.

Embodiment 3

The following is a description of Embodiment 3 of the present invention, which is configured so that the operation mode of the terminal 100 when booted up after performing update secure boot processing can be controlled, for example by partially limiting the terminal's functions in accordance with the results of comparison processing carried out during update secure boot processing.

Figure 8:
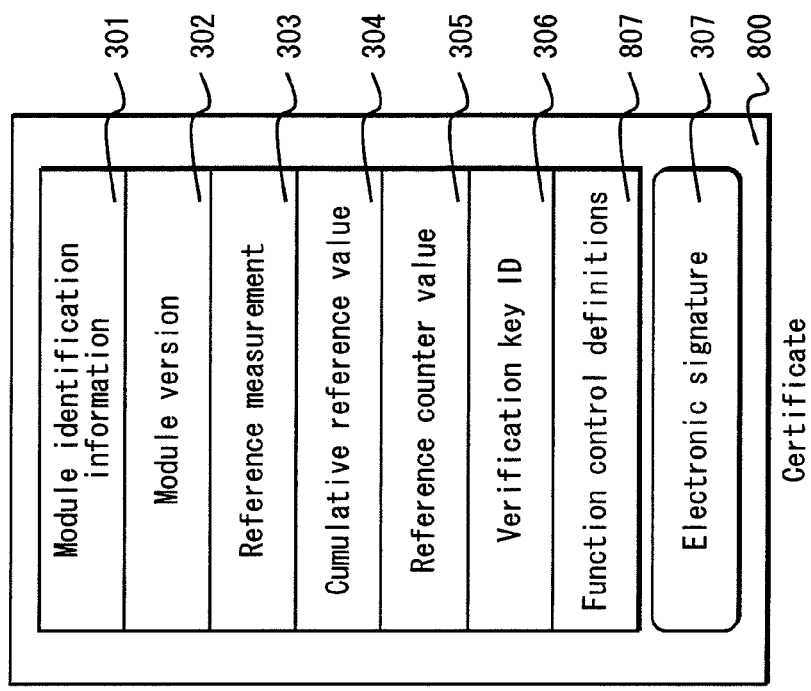
FIG. 8 shows the data structure of a certificate for a software module in Embodiment 3 of the present invention.

FIG. 8 shows the data structure of a certificate 800 for a software module in Embodiment 3 of the present invention. Other than the addition of a field to define the function controls, i.e. the function control definitions 807, this certificate is identical to the certificate in Embodiment 1.

In the function control definitions 807, the conditions for function controls and the actual function controls are recorded, for example, in XML format.

Conditions for function controls such as "always apply when booting up after performing update secure boot processing," "apply when alternate cumulative configuration information unit was used for comparison of the certificate's cumulative reference value," etc. are defined.

Actual function controls such as "emergency mode: all processing other than the restart of update processing is restricted," "non-communication mode: communication with the outside is restricted," "restricted mode: use of security services that use the security device 102, such as encrypting processing, is restricted," "communication mode: only certain communication with the outside (emergency telephone calls, etc.) is permitted," etc. are defined.

The structure of the terminal 100 is basically the same as in Embodiment 1. When executing the code images for the software modules during the update secure boot processing in step S614, the boot control unit performs function control by setting the internal parameters of each software module in accordance with the definitions in the function control definitions 807 in the certificate 800. Other operations are identical to Embodiment 1.

In the present embodiment, for example, by setting the condition for function control to "apply when alternate cumulative configuration information unit was used for comparison of the certificate's cumulative reference value" and the actual function control to "emergency mode: all processing other than the restart of update processing is restricted," then if secure boot processing is performed when update processing is incomplete, after boot processing, processing other than the restart of update processing will be restricted, and thus update processing will be prioritized, making it possible to complete update processing with a higher degree of certainty. Setting the condition for function control to "non-communication mode" or "restricted mode" will also provide an operation mode that restricts the terminal's functions if secure boot processing is performed when update processing is incomplete. This will encourage updating of terminal software that has become less safe, making it possible to reduce the risk of the system as a whole.

Embodiment 4

In Embodiment 1, during update processing, it was necessary to retain the former certificate without deleting it, but the structure of Embodiment 4 of the present invention makes such retention unnecessary, as explained below.

Figure 9:
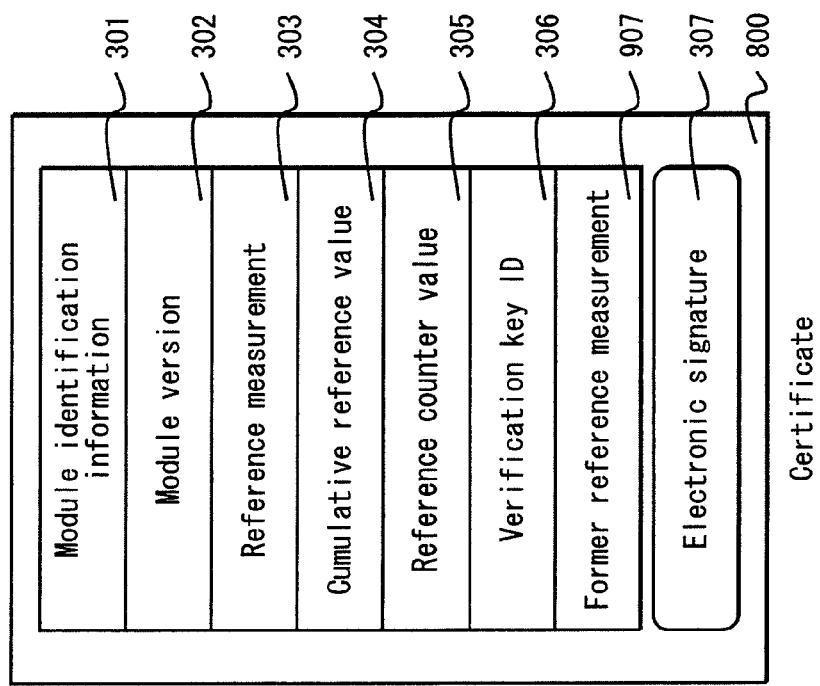
FIG. 9 shows the data structure of a certificate for a software module in Embodiment 4 of the present invention.

FIG. 9 shows the data structure of a certificate 900 for a software module in Embodiment 4 of the present invention. Other than the addition of a field showing the hash value for the software module's code image before updating, i.e. the former reference measurement 907, the data structure shown in FIG. 9 is identical to the certificate in Embodiment 1.

The former reference measurement 907 is set to the results for the hash calculation for the code image of the software module stored in the software module storage unit 106. This value is the same as the reference measurement 303 for the certificate that was stored in the certificate storage unit 107 before the certificate was updated.

The structure of the terminal 100 is basically the same as Embodiment 1, and its operations are also identical to Embodiment 1, except for the three differences listed below.

The first difference is that, in Embodiment 4, the former certificate is deleted rather than being retained in step S1202 of update processing.

Figure 10:
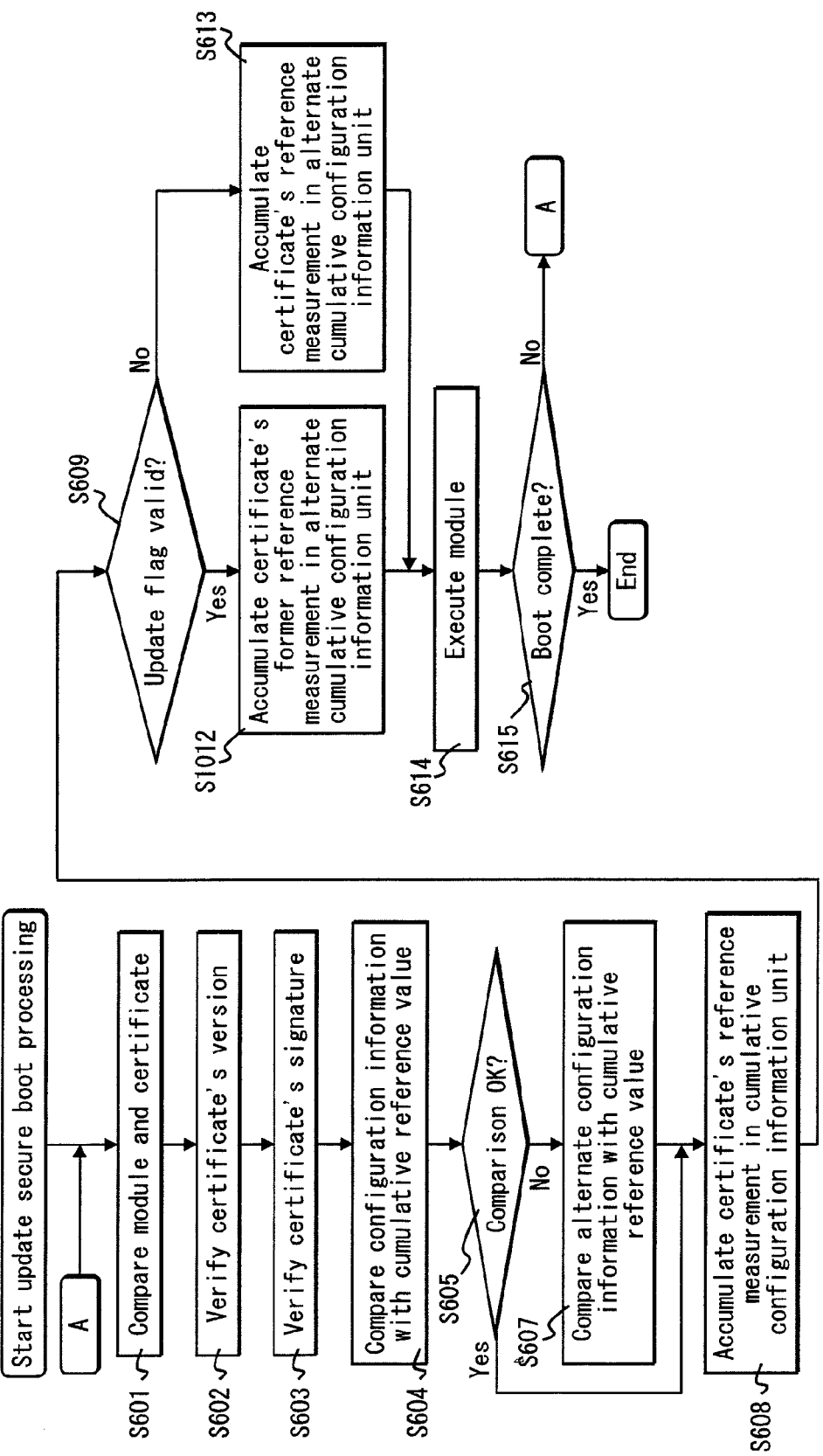
FIG. 10 is a flowchart of secure boot processing during an update in Embodiment 4 of the present invention.

The second difference is that, in Embodiment 4, as shown in FIG. 10, in step S609 of update secure boot processing, when the software module has a valid update flag (i.e. when update processing is incomplete or was completed for the software module), processing proceeds to step S1012, and the cumulative unit 221 in the alternate cumulative configuration information unit 103 combines the byte array for the value retained in the alternate configuration information retaining unit 222 with the byte array for the former accumulated reference value set in the certificate's former accumulated reference value 907 field. The cumulative unit 221 then further performs hash calculation on the combined byte array, storing the results in the alternate configuration information retaining unit 222 (step S1012).

The third difference is that, in Embodiment 4, in step S406 of secure boot processing, only resetting of the update flag is performed.

In the present embodiment, memory for retaining the former certificate is no longer necessary, and thus it is easy to apply the present invention to terminals with limited resources, such as cellular telephones.

Embodiment 5

Figure 11:
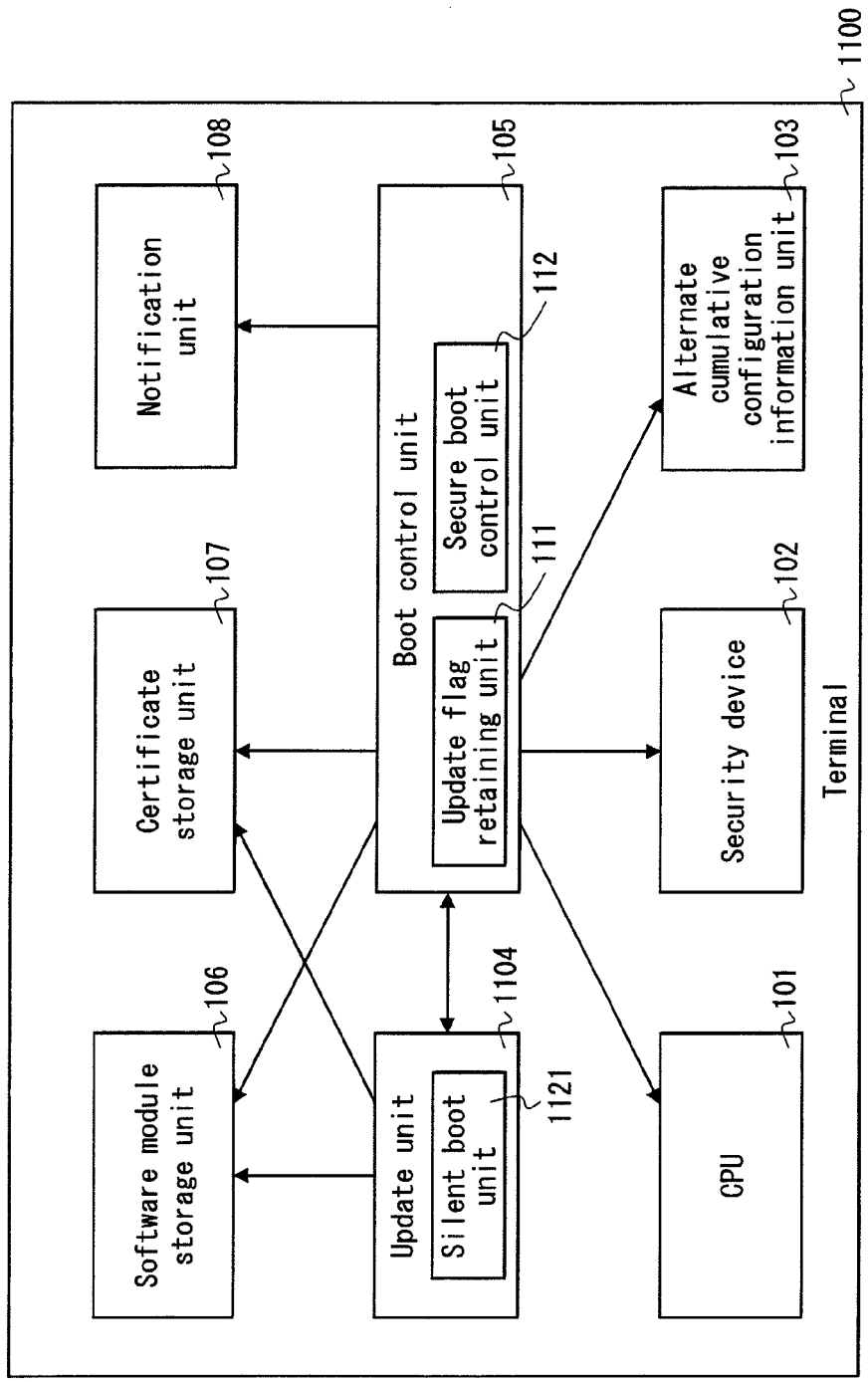
FIG. 11 is a block diagram showing the structure of the terminal in Embodiment 5 of the present invention.
Figure 13:
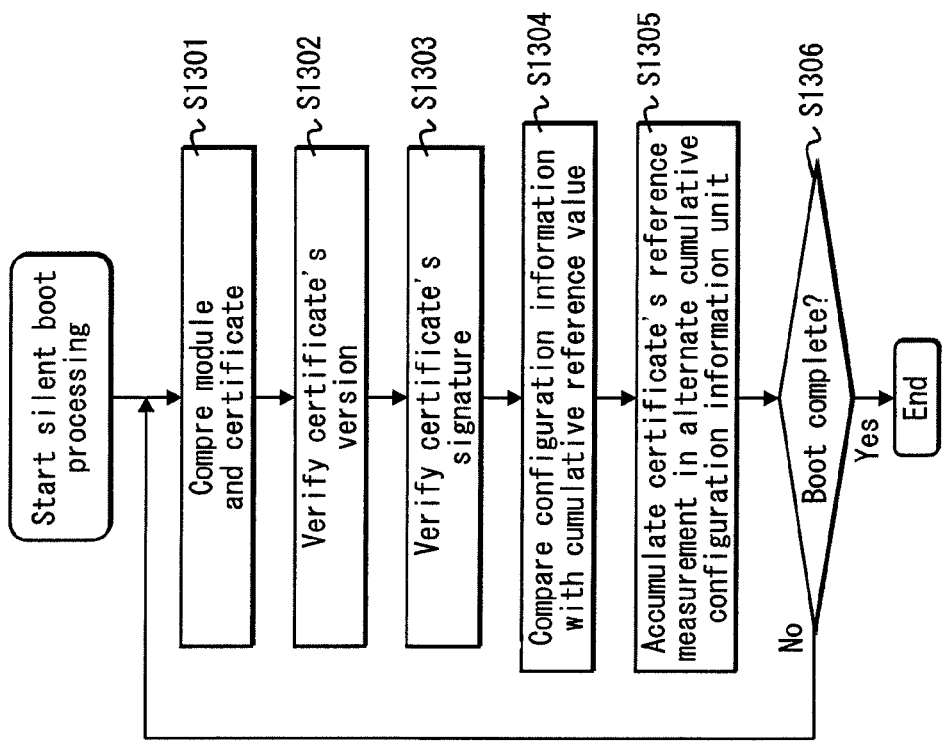
FIG. 13 is a flowchart of silent boot processing in Embodiment 5 of the present invention.

Embodiment 5 of the present invention is now described referring to FIGS. 11 and 13.

The terminal 1100 in Embodiment 5 of the present invention is constructed so as to verify, before starting update processing, that the code image and certificate for the latest software modules that have been acquired and the certificates that are not targeted for updating all match, thereby preventing erroneous updating of the terminal to a non-matching configuration and updating the terminal to a software configuration in which the code images and certificates for the software modules match.

FIG. 11 is a block diagram showing the structure of the terminal 1100 in Embodiment 5 of the present invention. In Embodiment 5, the update unit 1104 is further provided with a silent boot unit 1121 that verifies that the code image and certificate for the latest software modules and the certificates that are not targeted for updating all match. Other structural elements are identical to the terminal 100 in Embodiment 1.

In the present embodiment, before starting update processing, the silent boot unit 1121 performs silent boot processing based on the processing flow shown in FIG. 13. If no error is detected during silent processing, then update processing begins. Other operations are identical to the terminal 100 in Embodiment 1.

Concretely, silent boot processing occurs at a particular timing, such as immediately after the latest software module's code image and certificate have been downloaded. Silent boot processing is not limited to this timing, however, and can be performed at other times, such as when the terminal's processing load is low.

During silent boot processing, the silent boot unit 1121 first compares the software module and the certificate and verifies that a certificate corresponding to the software module exists (step S1301). Concretely, the unit performs a hash calculation (e.g., SHA-1 hash calculation) on the software module's code image and compares the result with the certificate's reference measurement 303. If the results of this comparison indicate conformity with the reference measurement 303, then the silent boot unit 1121 requests that the security device 102 verify the certificate, and processing proceeds to step S1302. When the results do not match, an error occurs, and silent boot processing terminates before completion.

In step S1302, the certificate verification unit 202 in the security device 102 verifies the certificate's version, verifying that the certificate is not an old, invalidated certificate (step S1302). Concretely, the unit compares the counter value retained by the security device's counter unit 204 with the certificate's reference counter value 305. A counter value indicating the lower limit of the software module's valid version is retained in the counter unit 204, and when the results of comparison with the counter value indicate that the reference counter value 305 is equal to or higher than the counter value retained in the counter unit 204, processing proceeds to step S1303. Otherwise, an error occurs, and silent boot processing terminates before completion.

In step S1303, the certificate verification unit 202 in the security device 102 further verifies the certificate's signature, verifying that the certificate has a valid electronic signature (step S1303). When the electronic signature is valid, processing proceeds to step S1304. When the electronic signature is invalid, an error occurs, and silent boot processing terminates before completion.

The verification in steps S1301, S1302, and S1303 indicates that the software module and the certificate correspond to each other, and verification of the validity of the certificate verifies the validity of the software module itself.

In step S1304, the silent boot unit 1121 compares the certificate's cumulative reference value with the configuration information retained by the alternate configuration information retaining unit 222 to verify that the state of the software module before execution is a proper state (the software module executed previously is a valid software module and was executed in the proper order). When the certificate's cumulative reference value matches the configuration information retained by the alternate configuration information retaining unit 222, processing proceeds to step S1305. Otherwise, an error occurs, and the silent boot unit 1121 terminates before completion.

In step S1305, the silent boot unit 1121 combines the byte array for the value retained by the alternate configuration information retaining unit 222 with the byte array for the cumulative reference value set in the certificate's cumulative reference value field. The silent boot unit 1121 then further performs hash calculation (e.g. SHA-1 hash calculation) on the combined byte array, storing the results in the alternate configuration information retaining unit 222 (step S1305).

Silent boot processing does not actually execute the software module's code image, but rather determines in step S1306 whether silent boot processing has been completed.

When all of the software modules that need to be verified during silent boot processing have been verified, silent boot processing is complete. When silent boot processing is determined not to be complete, processing returns to step S1301, and the processing between steps S1301 and S1306 is repeated for the next software module to be executed and its certificate.

When no error is detected in silent boot processing, the update unit 1104 commences update processing.

In the present embodiment, before update processing begins, the code image and certificate for acquired software modules are verified to see whether they match the certificates that are not to be updated. This prevents erroneous updating of the terminal to a non-matching configuration and ensures that the terminal is updated to a software configuration in which the code images and certificates for the software modules match.

Embodiment 6

The following is a description of Embodiment 6 of the present invention, which is configured to more effectively prevent old software modules from being executed and to continually maintain the terminal 100 in the newest software configuration.

Figure 14:
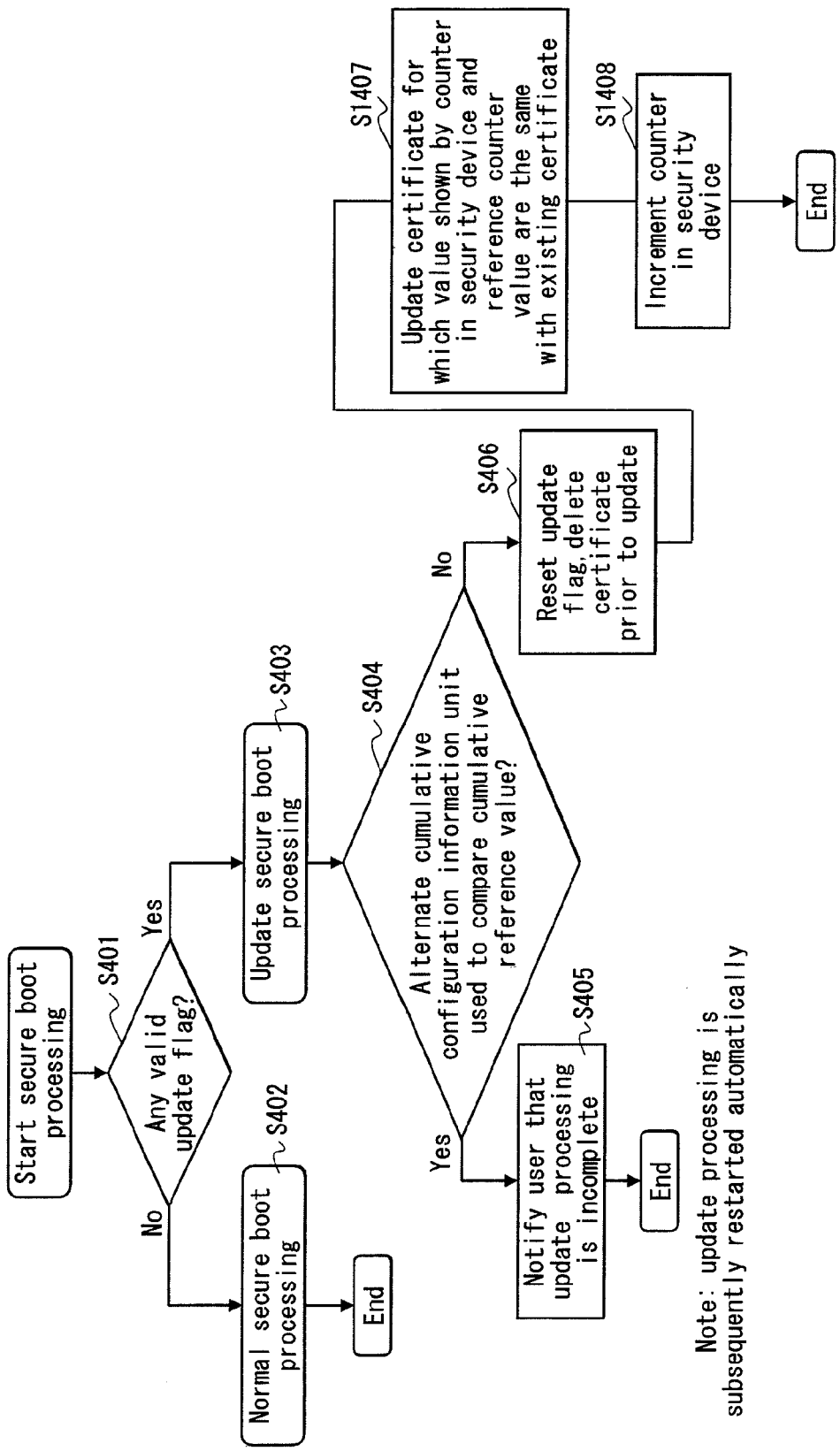
FIG. 14 is a flowchart of update processing in Embodiment 6 of the present invention.

FIG. 14 is a flowchart of secure boot processing in Embodiment 6 of the present invention. By performing the secure boot processing shown in FIG. 14, it is possible to prevent old software modules from being executed.

The structure of terminal 100 is basically the same as Embodiment 1, and apart from the processing after step S406, its operations are also identical to Embodiment 1.

Steps S401 through S406 of the secure boot processing in Embodiment 6 of the present invention are identical to the operations in Embodiment 1.

After step S406, i.e. when the software modules and certificates match during update secure boot processing, and after the update flag is reset and the former certificate from before updating is deleted, processing proceeds to step S1407. In step S1407, from among the certificates stored in the certificate storage unit 107, the certificates whose reference counter value is the same as the value shown by the counter unit 204 in the security device 102 (i.e., certificates that have not been updated) are updated using the available certificate stored in the certificate storage unit. At this time, the secure boot control unit 112 requests that the update unit 104 perform update processing on the certificate. Based on the request from the secure boot control unit 112, the update unit 104 sends an order to the security device 102. The security device 102 sets the certificate's reference counter value 305 to the counter value retained in the counter unit 204 in the security device 102 incremented by one. The security device then generates a signature via the encrypting key retained in the encryption and decryption unit 205 in the security device 102 and sets the digital signature 307 field to this signature. Since updating of the certificate is performed using the certificate stored in the certificate storage unit, this processing effectively only updates the certificate's reference counter value 305 and digital signature 307 fields, without changing the values of other fields.

Next, in step S1408, the update unit 104 requests that the counter value retained in the counter unit in the security device 102 be incremented. After the counter value retained in the counter unit in the security device 102 is incremented by one, update processing is complete.

Via the processing in steps S1407 and S1408, the reference counter values 305 and the counter values retained in the counter unit in the security device 102 for all of the certificates are always set to the same value.

During secure boot processing based on the processing flow in FIGS. 4, 5, and 6 in the present embodiment, for all software modules, before the code image is executed, each certificate's version is verified. During verification of a certificate's version, the certificate's reference counter value 305 is verified as being equal to or greater than the counter value retained in the counter unit 204, and when the certificate's reference counter value 305 is smaller than the counter value retained in the counter unit 204, that software module's code image is not executed.

Therefore, the present embodiment prevents old software modules from being executed, and the terminal 100 is always maintained in the latest software configuration.

Embodiment 7

In Embodiment 7 of the present invention, Embodiments 1 through 6 as described above can be realized in accordance with the specifications prescribed by the Trusted Computing Group (TCG).

In this case, the security device 102 is either a TPM module or an MTM module prescribed by the TCG (hereinafter, the term TPM refers to either a TPM or an MTM); the cumulative configuration information unit 201 is a PCR provided in the TPM; the counter unit is a Monotonic Counter provided in the TPM; the cumulative unit 211, the certificate verification unit 202, and the comparison unit 203 are units to implement the TCG functions including POM command processing; the certificates 300, 800, and 900 are either an External RIM_Cert or an Internal RIM_Cert; the alternate cumulative configuration information unit 103 is for virtually implementing the PCR functions in the TPM (here referred to as an alternate PCR); and the cumulative unit 221 performs TCG extend processing using the alternate PCR. In this way, safe software updates are possible in accordance with TCG specifications.

Other Modifications

The present invention has been explained based on the above-described embodiments, but of course the present invention is not limited to these embodiments. Cases such as the following are also included in the present invention.

1. Each of the above-mentioned apparatuses are, concretely, a computer system comprising a microprocessor, ROM, RAM, a hard disk unit, a display unit, a keyboard, a mouse, etc. The RAM or hard disk unit stores a computer program. When the microprocessor operates in accordance with the computer program, each apparatus fulfills its functions. In order to fulfill specific functions, the computer program is composed of a plurality of command codes that give instructions to the computer. Note that each apparatus is not limited to a computer system that includes all of the aforementioned elements (a microprocessor, ROM, RAM, a hard disk unit, a display unit, a keyboard, a mouse, etc.), but may also be a computer system comprising only a portion thereof.

2. Either all or a portion of the structural elements comprising each apparatus listed above may be contained on a single system LSI (Large Scale Integration). A System LSI is a super multifunctional LSI manufactured by integrating a plurality of structural unit on a single chip. Concretely, it is a computer system that includes a microprocessor, ROM, RAM, etc. A computer program is stored on the RAM. When the microprocessor operates in accordance with the computer program, the system LSI fulfills its functions.

Each of the structural elements comprising each apparatus listed above may be on a separate chip, or all or a portion of the circuits may be included on one chip.

A system LSI was referred to above, but according to its degree of integration, it may be called an IC, super LSI, or ultra LSI. The method for integrating the circuit is not limited to LSI, but can also be implemented via a dedicated circuit or a generic processor. An FPGA (Field Programmable Gate Array) which can be programmed after production of the LSI, or a reconfigurable processor in which the connections and settings of the circuit cells in the LSI can be reconfigured, could also be used.

Furthermore, if integrated circuit technology that replaces LSIs via advances in semiconductor technology or other technology appears, then of course the function block can be integrated using that technology. The application of biotechnology, etc. is plausible.

3. Either all or a portion of the structural elements comprising each apparatus listed above may be contained on an IC card, or a stand-alone module, that can be removed from each apparatus. The IC card or module is a computer system consisting of a microprocessor, ROM, RAM, etc. The IC card or module can include a super multifunctional LSI as mentioned above. When the microprocessor operates in accordance with the computer program, the IC card or module fulfills its functions. The IC card or module may have tamper resistance.

4. The present invention includes the above-described methods. The present invention also includes a computer program that implements these methods via a computer, or the digital signals comprised of the computer program.

In the present invention, the above-mentioned computer program or digital signal may be recorded on a recording medium readable by a computer, such as a flexible disk, hard disk, CD-ROM, MO, DVD, DVD-ROM, DVD-RAM, BD (Blu-ray Disc), semiconductor memory, etc. The present invention also includes the above-mentioned digital signal recorded on these recording media.

In the present invention, the above-mentioned computer program or digital signal may be transmitted via a telecommunications network, wired or wireless communications network, a network of which the Internet is representative, data broadcasting, etc.

The present invention may also be a computer system provided with a microprocessor and memory, wherein a computer program is stored in the memory, and the microprocessor operates in accordance with the computer program.

By recording the program or the digital signal on the recording medium to transfer it, or by transferring the program or the digital signal over one of the above-mentioned networks, etc., the invention may be implemented on an independent computer.

5. The security device can be implemented by tamper resistant software or by software and hardware.

6. The CPU may be provided with a special operation mode (secure mode, etc.), and the software executed by the CPU may be executed safely by operating in such a special operation mode (secure mode, etc.).

7. The above-mentioned embodiments and other modifications may be combined with each other.

INDUSTRIAL APPLICABILITY

The present invention can be widely used in telecommunication devices and home appliances that update program data such as personal computers, cellular telephones, audio players, television receivers, video recorders, etc.

The security module loaded on the terminal in the present invention is loaded onto such devices, and by having a structure identical to the terminal in the present invention, when the software on the device comprises a plurality of software modules, the security module prevents improper activity such as exchanging the software modules with old modules and makes it possible to perform update processing individually for each software module.

Furthermore, even when the power is cut off during updating of a certificate causing a software module's code image and certificate not to match, then by comparing and verifying a cumulative configuration information unit and an alternate virtual cumulative configuration information unit during boot processing, the present invention makes it possible to complete secure boot processing without executing the old software module and to restart update processing of the certificate.

The invention claimed is:

1. A secure boot terminal for booting a plurality of software modules in a predetermined boot order, the secure boot terminal comprising:
a first storage unit for storing a digital certificate for each software module of the plurality of software modules, the digital certificate, for each respective software module of the plurality of software modules, including (i) a target digest value calculated as a digest value of the respective software module, and (ii) a target cumulative value of target digest values of other software modules, of the plurality of software modules, booted prior to the respective software module;
a verification unit that, with respect to each respective software module of the plurality of software modules, verifies, for a subsequent software module in the predetermined boot order, a validity of other software modules of the plurality of software modules booted prior to the subsequent software module, the validity of the other software modules booted prior to the subsequent software module being verified by comparing (i) an actual cumulative value obtained by a cumulative calculation of digest values of the other software modules booted prior to the subsequent software module, and (ii) the target cumulative value included in the digital certificate corresponding to the subsequent software module;
an update unit that updates one software module of the plurality of software modules and the digital certificate corresponding to the one software module;
a second storage unit for storing, for each respective software module of the plurality of software modules, an alternate cumulative value obtained by a cumulative calculation of the target digest values of the other software modules booted prior to the respective software module, the cumulative calculation of the target digest values of the other software modules booted prior to the respective software module being made using, for each of the other software modules booted prior to the respective software module, (i) when the digital certificate of the other software module has been updated, the target digest value included in the digital certificate of the other software module prior to the updating of the digital certificate, and (ii) when the digital certificate of the other software module has not been updated, the target digest value included in the digital certificate of the other software module; and
a boot control unit that, with respect to each respective software module of the plurality of software modules, (i) when the verification of the validity performed by the verification unit is successful, boots the subsequent software module of the plurality of software modules, and (ii) when the verification of the validity performed by the verification unit fails, compares the alternate cumulative value corresponding to the subsequent software module with the target cumulative value included in the digital certificate corresponding to the subsequent software module, and when the compared alternate cumulative and target cumulative values match, the boot control unit boots the subsequent software module.

2. The secure boot terminal in claim 1, wherein, after all software modules of the plurality of software modules have been booted, the update unit updates the digital certificates corresponding to software modules, of the plurality of software modules, for which the verification by the verification unit failed.

3. The secure boot terminal in claim 2, further comprising:
an update determining unit that, with respect to a respective software module of the plurality of software modules, determines whether or not each of the other software modules of the plurality of software modules booted prior to the respective software module has been updated; and
an alternate cumulative unit that calculates the alternate cumulative value for each respective software module of the plurality of software modules by the cumulative calculation of the target digest values of the other software modules booted prior to the respective software module, and records the alternate cumulative value calculated for each respective software module on the second storage unit, the cumulative calculation being made using, for each of the other software modules booted prior to the respective software module, (i) when the other software module has been updated, the target digest value included in the digital certificate of the other software module prior to the updating of the other software module, and (ii) when the other software module has not been updated, the target digest value included in the digital certificate of the other software module.

4. The secure boot terminal in claim 3, wherein the alternate cumulative unit (i) confirms, for an updated software module of the plurality of software modules, whether the digest value calculated from the updated software module matches the target digest value included in the digital certificate corresponding to the updated software module, and (ii) when the compared digest and target digest values match, cumulatively calculates the target digest value included in the digital certificate corresponding to the updated software module prior to the updating of the updated software module.

5. The secure boot terminal in claim 3, wherein the alternate cumulative unit encrypts each alternate cumulative value calculated for the plurality of software modules and stores the each of the encrypted alternative cumulative values in the second storage unit.

6. The secure boot terminal in claim 1, further comprising a notification unit that, when a software module, of the plurality of software modules, for which the verification by the verification unit fails is booted by the boot control unit, provides a notification that the digital certificate corresponding to the software module for which the verification fails requires updating.

7. The secure boot terminal in claim 1, wherein
the digital certificate includes restriction information that indicates which functions are to be restricted when the verification by the verification unit fails, and
the boot control unit boots software modules, of the plurality of software modules, for which the verification by the verification unit fails in a state with restricted functions, as indicated by the restriction information.

8. The secure boot terminal in claim 1, further comprising a structure storage unit for storing, for each respective software module of the plurality of software modules, (i) a plurality of structures each having a region for storing information indicating the respective software module, for storing information indicating a current digital certificate corresponding to the respective software module, and for storing information indicating the digital certificate prior to updating that corresponds to the respective software module, and (ii) a current structure pointer indicating which structure in the plurality of structures is currently in use, wherein
the update unit further includes:
an obtaining subunit that obtains an updated version of the one software module, as well as an updated version of the digital certificate corresponding to the one software module;
a structure update subunit that writes, in an update structure among the structures corresponding to the one software module not indicated by the current structure pointer, (i) information indicating the updated version of the one software module as the information indicating the respective software module in the update structure, (ii) information indicating the updated version of the digital certificate corresponding to the one software module as the information indicating the current digital certificate in the update structure, and (iii) information indicating the current digital certificate for the structure indicated by the current structure pointer as the information indicating the digital certificate prior to updating in the update structure; and
a pointer changing subunit operable to change the current structure pointer to indicate the update structure.

9. The secure boot terminal in claim 1, further comprising:
an obtaining unit that obtains an updated version of the digital certificate corresponding to the one software module of the plurality of software modules;
a preliminary cumulative value generation unit that generates a preliminary cumulative value by a cumulative calculation of target digest values for each of the other software modules booted prior to the one software module; and
a preliminary verification unit that verifies a validity, for each of the other software modules booted prior to the one software module, by comparing the preliminary cumulative value of the other software module with a target cumulative value included in an updated version of the digital certificate of the other software module, wherein
when the verification by the preliminary verification unit is successful, the update unit further updates the digital certificate corresponding to the one software module using the updated version of the digital certificate.

10. A secure boot method used in a secure boot terminal for booting a plurality of software modules in a predetermined boot order, the secure boot method comprising:
storing a digital certificate for each software module of the plurality of software modules, the digital certificate, for each respective software module of the plurality of software modules, including (i) a target digest value calculated as a digest value of the respective software module, and (ii) a target cumulative value of target digest values of other software modules, of the plurality of software modules, booted prior to the respective software module;
with respect to each respective software module of the plurality of software modules, verifying, for a subsequent software module in the predetermined boot order, a validity of other software modules of the plurality of software modules booted prior to the subsequent software module, the validity of the other software modules booted prior to the subsequent software module being verified by comparing (i) an actual cumulative value obtained by a cumulative calculation of digest values of the other software modules booted prior to the subsequent software module and (ii) the target cumulative value included in a digital certificate corresponding to the subsequent software module;

updating one software module of the plurality of software modules and the digital certificate corresponding to the one software module;

storing, for each respective software module of the plurality of software modules, an alternate cumulative value obtained by a cumulative calculation of the target digest values of the other software modules booted prior to the respective software module, the cumulative calculation of the target digest values of the other software modules booted prior to the respective software module being made using, for each of the other software modules booted prior to the respective software module, (i) when the digital certificate of the other software module has been updated, the target digest value included in the digital certificate of the other software module prior to the updating of the digital certificate, and (ii) when the digital certificate of the other software module has not been updated, the target digest value included in the digital certificate of the other software module; and with respect to each respective software module of the plurality of software modules, (i) when the verification of the validity by said verification is successful, booting the subsequent software module of the plurality of software modules, and (ii) when the verification of the validity by said verification fails, comparing the alternate cumulative value corresponding to the subsequent software module with the target cumulative value included in the digital certificate corresponding to the subsequent software module, and when the compared alternate cumulative and target cumulative values match, booting the subsequent software module.

11. A non-transitory computer-readable recording medium having a secure boot program recorded thereon, the secure boot program for being used in a secure boot terminal for booting a plurality of software modules in a predetermined boot order, the secure boot program causing a computer to execute a method comprising:

storing a digital certificate for each software module of the plurality of software modules, the digital certificate, for each respective software module of the plurality of software modules, including (i) a target digest value calculated as a digest value of the respective software module, and (ii) a target cumulative value of target digest values of other software modules, of the plurality of software modules, booted prior to the respective software module;

with respect to each respective software module of the plurality of software modules, verifying, for a subsequent software module in the predetermined boot order, a validity of other software modules of the plurality of software modules booted prior to the subsequent software module, the validity of the other software modules booted prior to the subsequent software module being verified by comparing (i) an actual cumulative value obtained by a cumulative calculation of digest values of the other software modules booted prior to the subsequent software module, and (ii) the target cumulative value included in a digital certificate corresponding to the subsequent software module;

updating one software module of the plurality of software modules and the digital certificate corresponding to the one software module;

storing, for each respective software module of the plurality of software modules, an alternate cumulative value obtained by a cumulative calculation of the target digest values of the other software modules booted prior to the respective software module, the cumulative calculation of the target digest values of the other software modules booted prior to the respective software module being made using, for each of the other software modules booted prior to the respective software module, (i) when the digital certificate of the other software module has been updated, the target digest value included in the digital certificate of the other software module prior to the updating of the digital certificate, and (ii) when the digital certificate of the other software module has not been updated, the target digest value included in the digital certificate of the other software module; and with respect to each respective software module of the plurality of software modules, (i) when the verification of the validity by said verification is successful, booting the subsequent software module of the plurality of software modules, and (ii) when the verification of the validity by said verification fails, comparing the alternate cumulative value corresponding to the subsequent software module with the target cumulative value included in the digital certificate corresponding to the subsequent software module, and when the compared alternate cumulative and target cumulative values match, booting the subsequent software module.

12. An integrated circuit for booting a plurality of software modules in a predetermined boot order, the integrated circuit comprising:

a first storage unit for storing a digital certificate for each software module of the plurality of software modules, the digital certificate, for each respective software module of the plurality of software modules, including (i) a target digest value calculated as a digest value of the respective software module, and (ii) a target cumulative value of target digest values of other software modules, of the plurality of software modules, booted prior to the respective software module;

a verification unit that, with respect to each respective software module of the plurality of software modules, verifies, for a subsequent software module in the predetermined boot order, a validity of other software modules of the plurality of software modules booted prior to the subsequent software module, the validity of the other software modules booted prior to the subsequent software module being verified by comparing (i) an actual cumulative value obtained by a cumulative calculation of digest values of the other software modules booted prior to the subsequent software module, and (ii) the target cumulative value included in the digital certificate corresponding to the subsequent software module;

an update unit that updates one software module of the plurality of software modules and the digital certificate corresponding to the one software module;

a second storage unit for storing, for each respective software module of the plurality of software modules, an alternate cumulative value obtained by a cumulative calculation of the target digest values of the other software modules booted prior to the respective software module, the cumulative calculation of the target digest values of the other software modules booted prior to the respective software module being made using, for each of the other software modules booted prior to the respective software module, (i) when the digital certificate of the other software module has been updated, the target digest value included in the digital certificate of the other software module prior to the updating of the digital certificate, and (ii) when the digital certificate of the other software module has not been updated, the target digest value included in the digital certificate of the other software module; and a boot control unit that, with respect to each respective software module of the plurality of software modules, (i) when the verification of the validity performed by the verification unit is successful, boots the subsequent software module of the plurality of software modules, and (ii) when the verification of the validity performed by the verification unit fails, compares the alternate cumulative value corresponding to the subsequent software module with the target cumulative value included in the digital certificate corresponding to the subsequent software module, and when the compared alternate cumulative and target cumulative values match, the boot control unit boots the subsequent software module.

* * * * *